United States Patent
Wakabayashi et al.

(10) Patent No.: US 9,420,244 B2
(45) Date of Patent: Aug. 16, 2016

(54) REFLECTIVE POLARIZING PLATE APPARATUS, ELECTRO-OPTIC APPARATUS, OPTICAL APPARATUS, AND PROJECTOR

(75) Inventors: Shinichi Wakabayashi, Suwa (JP); Hirohisa Nakano, Matsumoto (JP); Satoru Nagarekawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 914 days.

(21) Appl. No.: 13/542,402

(22) Filed: Jul. 5, 2012

(65) Prior Publication Data

US 2013/0016322 A1   Jan. 17, 2013

(30) Foreign Application Priority Data

Jul. 14, 2011 (JP) .................. 2011-155470
Oct. 7, 2011 (JP) .................. 2011-222589

(51) Int. Cl.
*G03B 21/14* (2006.01)
*H04N 9/31* (2006.01)
*G03B 21/20* (2006.01)
*G03B 33/12* (2006.01)

(52) U.S. Cl.
CPC ............ *H04N 9/3167* (2013.01); *G03B 21/145* (2013.01); *G03B 21/2073* (2013.01); *H04N 9/3105* (2013.01); *G03B 33/12* (2013.01)

(58) Field of Classification Search
CPC .......... G02B 27/283; G02B 7/00; G02B 5/30; H04N 9/3167; H04N 5/74; G03B 21/14; G03B 21/00; G02F 1/1335
See application file for complete search history.

(56) References Cited

U.S. PATENT DOCUMENTS 6,000,802 A * 12/1999 Hashizume ........ G02B 27/1026
                                                                      349/5
6,460,998 B1 * 10/2002 Watanabe ........................ 353/20
6,619,800 B1 *  9/2003 Takezawa et al. .............. 353/20

FOREIGN PATENT DOCUMENTS

| CN | 1282000 A | 1/2001 |
|---|---|---|
| JP | 2002-182213 A | 6/2002 |
| JP | 2008-158255 | 7/2008 |
| JP | 2008-180856 A | 8/2008 |
| JP | 2008180856 A * | 8/2008 |
| JP | 2008-225508 A | 9/2008 |

* cited by examiner

*Primary Examiner* — Sultan Chowdhury
*Assistant Examiner* — Danell L Owens
(74) *Attorney, Agent, or Firm* — ALG Intellectual Property, LLC

(57) ABSTRACT

A reflective polarizing plate apparatus includes a reflective polarizing plate that transmits first linearly polarized light and reflects second linearly polarized light polarized in a direction substantially perpendicular to the direction in which the first linearly polarized light is polarized, a holding member that accommodates and holds the reflective polarizing plate, and a first biasing member that biases a glass surface of the reflective polarizing plate accommodated in the holding member.

20 Claims, 9 Drawing Sheets

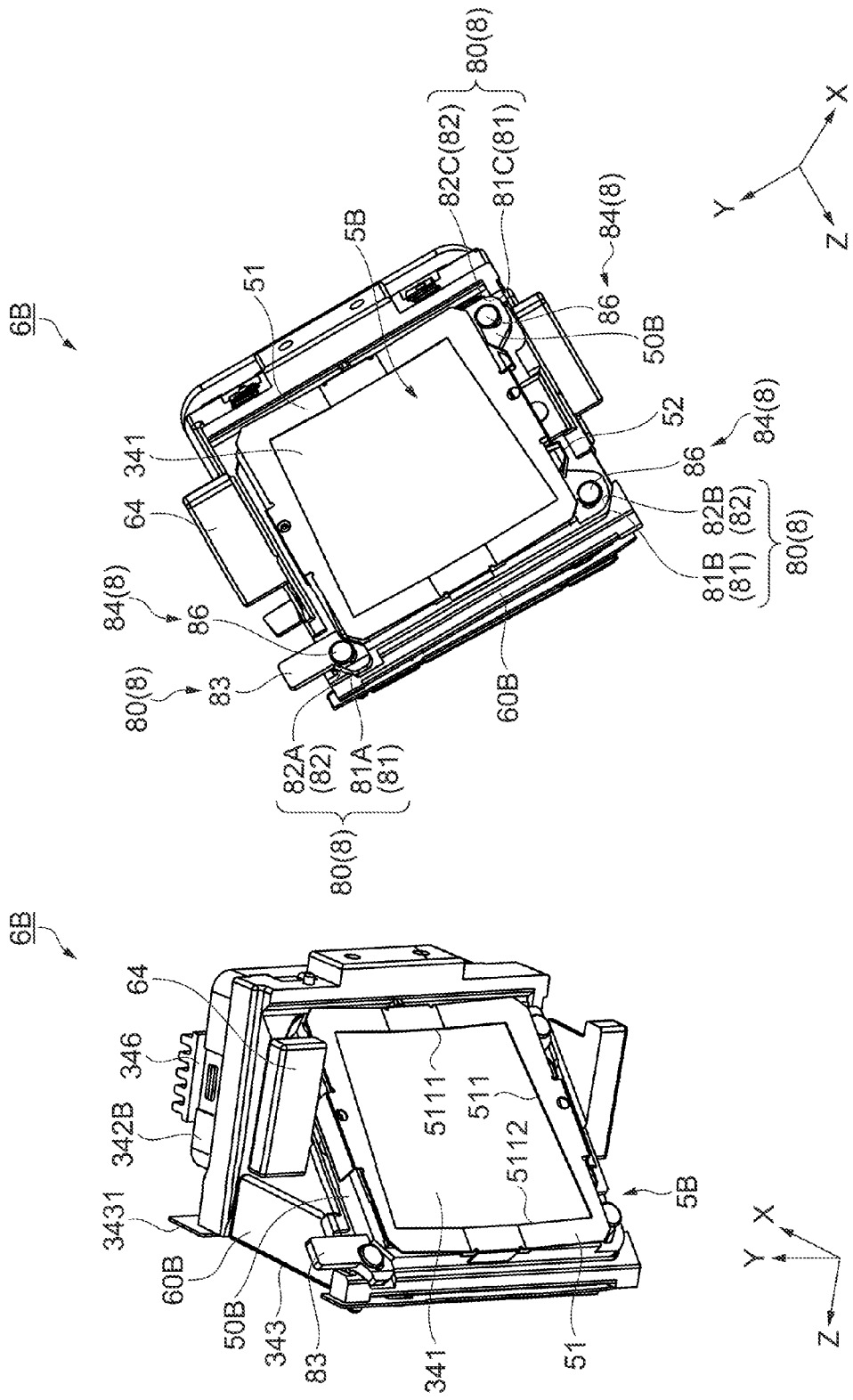

REFLECTIVE POLARIZING PLATE APPARATUS, ELECTRO-OPTIC APPARATUS, OPTICAL APPARATUS, AND PROJECTOR

BACKGROUND

1. Technical Field

The present invention relates to a reflective polarizing plate apparatus, an electro-optic apparatus, an optical apparatus, and a projector.

2. Related Art

There have been projectors known to use a reflective light modulating device. Some of the projectors include a wire-grid reflective polarizing plate.

JP-A-2008-180856 discloses a projection display system (projector) including reflective spatial light modulators, a color light illuminator, wire-grid polarizers, a light combining system, a supporting member for each color light flux disposed in the vicinity of a light-incident surface of the light combining system and having at least a first surface to which a wire-grid polarizer for the color light flux is attached and a second surface to which the reflective spatial light modulator for the color light flux is attached via a position adjusting mechanism, and a projection lens. Each of the wire-grid polarizers has a wire grid formed of metal lines disposed on one surface of an optical glass substrate, and the surface of the optical glass substrate where the wire grid is not formed is removably fixed to the first surface of the supporting member for the color light flux corresponding to the wire-grid polarizer by using a spring member for fixing the wire-grid polarizer.

Specifically, each of the wire-grid polarizers is placed on three protrusions in a deeper one of two recesses formed around a rectangular hole provided through the first surface of the corresponding supporting member, which has a triangularly columnar shape. Further, a sealing member is disposed on the shallower recess while overhanging over the deeper recess, and a plate spring member is disposed over the entire structure. Three pressing portions of the plate spring member that correspond to the protrusions perpendicularly press and fix the wire-grid polarizer, and a frame portion of the plate spring member presses and fixes the sealing member. The plate spring member is fixed to the triangularly columnar supporting member by hooking rectangular holes of the plate spring member to stubs formed on the lower and upper surfaces of the supporting member, whereby the pressing portions of the plate spring member apply a fixed load to the wire-grid polarizer. JP-A-2008-180856 states that the configuration described above can reduce the amount of misregistration and hence provide a highly stable, high-quality image.

In JP-A-2008-180856, the pressing portions of the plate spring member fix each of the wire-grid polarizers by applying a fixed load thereto in the direction perpendicular to a flat surface thereof, as described above. The thus fixed wire-grid polarizer, however, tends to rotate when an impact (including physical and thermal impact), vibration, or any other external force is applied thereto. The wire-grid polarizer (wire-grid reflective polarizing plate), when it is rotated in the plane thereof and hence angularly misaligned with a reflective light modulating device, can seriously cause decrease in contrast. A wire-grid reflective polarizing plate has another problem of distortion of the reflective polarizing plate itself resulting from the way it is pressed for fixation and hence degradation in optical characteristics of the reflective polarizing plate.

Further, in JP-A-2008-180856, since each of the wire-grid polarizers is fixed to the supporting member for the corresponding color light with the surface where the wire grid is not formed facing the first surface of the supporting member and the surface where the wire gird is formed faces the wire-grid polarizer fixing spring member (plate spring member), the plate spring member comes into contact with the surface where the wire grid is formed. The configuration in which the plate spring member comes into contact with the wire grid tends to cause the wire grid to be chipped or otherwise become defective, which degrades the quality of the wire-grid polarizer (wire-grid reflective polarizing plate). Further, JP-A-2008-180856 does not describe any angular adjustment of the wire-grid polarizer (wire-grid reflective polarizing plate) relative to the reflective spatial light modulator (reflective light modulating device).

It has therefore been desired to develop a reflective polarizing plate apparatus, an electro-optic apparatus, an optical apparatus, and a projector capable of not only maintaining optical characteristics of a reflective polarizing plate and reliably fixing the reflective polarizing plate against an impact or vibration by appropriately pressing the reflective polarizing plate but also angularly adjusting the reflective polarizing plate relative to a reflective light modulating device and improving the contrast by the angle adjustment.

SUMMARY

An advantage of some aspects of the invention is to solve at least a part of the problems described above, and the invention can be implemented as the following application examples:

Application Example 1

A reflective polarizing plate apparatus according to this application example includes a reflective polarizing plate that transmits first linearly polarized light and reflects second linearly polarized light polarized in a direction substantially perpendicular to the direction in which the first linearly polarized light is polarized, a holding member that accommodates and holds the reflective polarizing plate, and a first biasing member that biases a flat surface of the reflective polarizing plate accommodated in the holding member.

According to the reflective polarizing plate apparatus described above, the first biasing member biases a flat surface of the reflective polarizing plate against the holding member, whereby the reflective polarizing plate can be reliably fixed to the holding member. As a result, even when an impact or vibration is applied to the reflective polarizing plate apparatus, the reflective polarizing plate will not rotate in the plane thereof relative to the holding member.

Application Example 2

It is preferable that the reflective polarizing plate apparatus according to the application example described above further includes a second biasing member that biases a side surface of the reflective polarizing plate accommodated in the holding member.

According to the reflective polarizing plate apparatus described above, not only does the first biasing member bias a flat surface of the reflective polarizing plate but also the second biasing member biases a side surface of the reflective polarizing plate. The configuration in which the side surface as well as the flat surface is biasd allows the reflective polarizing plate to be reliably fixed to the holding member. As a result, even when an impact or vibration is applied to the reflective polarizing plate apparatus, the reflective polarizing plate will not rotate in the plane thereof relative to the holding member.

Application Example 3

In the reflective polarizing plate apparatus according to the application example described above, it is preferable that the reflective polarizing plate is so accommodated that a functional surface thereof faces the accommodating portion of the holding member, and that the first biasing member biases a surface facing away from the functional surface.

According to the reflective polarizing plate apparatus described above, the reflective polarizing plate is so accommodated that the functional surface thereof faces the accommodating portion of the holding member, and the first biasing member biases the surface facing away from the functional surface, whereby the first biasing member will not damage the functional surface (for example, wire grid will not be chipped or otherwise become defective), and the quality of the reflective polarizing plate will not be degraded.

Application Example 4

In the reflective polarizing plate apparatus according to the application example described above, it is preferable that the holding member has three holding portions that come into contact with and hold one surface of the reflective polarizing plate, and that the first biasing member has three biasing portions in positions facing the three holding portions, and the three biasing portions press and bias the other surface of the reflective polarizing plate.

According to the reflective polarizing plate apparatus described above, the three holding portions of the holding member come into contact with and hold one surface of the reflective polarizing plate, and the three biasing portions of the first biasing member that face the three holding portions press and bias the other surface of the reflective polarizing plate, whereby the reflective polarizing plate is fixed. In the configuration described above, both surfaces of the reflective polarizing plate can be supported by the three holding portions and the three biasing portions facing each other. Further, the three-point supporting allows the reflective polarizing plate to be fixed to the holding member with an appropriate magnitude of pressing force in an appropriate pressing method. Moreover, the three-point supporting allows the reflective polarizing plate to be reliably fixed without deformation or any other defects even when an impact (including physical and thermal impact), vibration, or any other external force is applied. As a result, the reflective polarizing plate itself will not be distorted in normal operation, or the reflective polarizing plate will not move relative to the holding member even when an impact, vibration, or any other external force is applied thereto. Optical characteristics of the reflective polarizing plate can therefore be maintained not only in normal operation but also when an impact, vibration, or any other external force is applied thereto.

Application Example 5

In the reflective polarizing plate apparatus according to the application example described above, it is preferable that each of the biasing portions has a substantially spherical tip and protrudes toward the other surface.

According to the reflective polarizing plate apparatus described above, since each of the biasing portions has a substantially spherical tip, the reflective polarizing plate can be appropriately supported and biasd even if the biasing portions are shifted.

Application Example 6

In the reflective polarizing plate apparatus according to the application example described above, it is preferable that the reflective polarizing plate has a rectangular shape, and that the holding portions come into contact with the one surface of the reflective polarizing plate in such a way that one of the holding portions comes into contact with one edge portion and the remaining two holding portions come into contact with the other edge portion facing the edge portion.

According to the reflective polarizing plate apparatus described above, the holding portions come into contact with one surface of the reflective polarizing plate in such a way that one of the holding portions comes into contact with an edge portion and the remaining two holding portions come into contact with another edge portion facing the edge portion. In correspondence therewith, the biasing portions of the first biasing member are formed to face the holding portions and press the other surface of the reflective polarizing plate. As a result, the reflective polarizing plate can be stably fixed to the holding member.

Application Example 7

In the reflective polarizing plate apparatus according to the application example described above, it is preferable that the two holding portions that come into contact with the other edge portion are disposed in positions substantially symmetrical with respect to a central line passing through the holding portion that comes into contact with the one edge portion and perpendicular to an exterior side of the other edge portion of the reflective polarizing plate.

According to the reflective polarizing plate apparatus described above, the reflective polarizing plate can be more stably fixed to the holding member.

Application Example 8

In the reflective polarizing plate apparatus according to the application example described above, it is preferable that the first biasing member has a light-blocking capability and has an opening that ensures a predetermined effective region, and that the opening has a substantially trapezoidal shape.

According to the reflective polarizing plate apparatus described above, the first biasing member, which has a light-blocking capability, can restrict the first linearly polarized light passing therethrough within an appropriate range because the first biasing member transmits a light flux incident on a predetermined effective region and blocks a light flux incident on the region outside the effective region. For example, when a reflective light modulating device is disposed behind the thus configured reflective polarizing plate apparatus, and the effective region of the first biasing member is set in correspondence with an effective region of the reflective light modulating device, the first linearly polarized light can be appropriately incident on the effective region of the reflective light modulating device. A projector using the reflective polarizing plate apparatus can therefore provide improved contrast. Further, since the opening of the first biasing member has a substantially trapezoidal shape, even when the holding member that accommodates the reflective polarizing plate is so disposed that it is inclined to the direction in which a light flux is incident, the first linearly polarized light can be restricted within an appropriate range because the first biasing member transmits the light flux incident on the trapezoidal opening as the predetermined effective region. For example, when the reflective light modulating device is so disposed behind the reflective polarizing plate apparatus that the reflective light modulating device is substantially perpendicular to the direction in which the light flux is incident, the light flux can be incident on the substantially rectangular effective region of the reflective light modulating device.

Application Example 9

An electro-optic apparatus according to this application example includes (a) a reflective polarizing plate apparatus including a reflective polarizing plate that transmits first linearly polarized light and reflects second linearly polarized light polarized in a direction substantially perpendicular to the direction in which the first linearly polarized light is polarized, a holding member that accommodates and holds the reflective polarizing plate, and a first biasing member that biases a flat surface of the reflective polarizing plate accommodated in the holding member, (b) a reflective light modulating device that modulates the first linearly polarized light having passed through the reflective polarizing plate apparatus in accordance with image information to form image light and reflects the image light as the second linearly polarized light, and (c) a substantially triangularly columnar-shaped supporting member having a first surface that supports the reflective polarizing plate apparatus, a second surface that supports the reflective light modulating device, and a third surface. The reflective polarizing plate apparatus is so supported by and fixed to the first surface that a functional surface of the accommodated reflective polarizing plate faces the reflective light modulating device.

According to the electro-optic apparatus described above, the reflective polarizing plate apparatus is so supported by and fixed to the first surface that the functional surface of the accommodated reflective polarizing plate faces the reflective light modulating device. As a result, the second linearly polarized light reflected off the reflective light modulating device can be directly reflected off the functional surface of the reflective polarizing plate. If the functional surface does not face the reflective light modulating device, the second linearly polarized light travels inside a glass substrate as a base substrate that forms the reflective polarizing plate. In this case, the shift of the optical path due to the refractive index of the glass substrate increases cumulatively. The configuration described above can eliminate the cumulative increases in the shift of the optical path due to the refractive index of the glass substrate.

Application Example 10

It is preferable that the electro-optic apparatus according to the application example described above further includes an adjuster that angularly adjusts the reflective polarizing plate relative to the reflective light modulating device by allowing the reflective polarizing plate apparatus to pivot in the plane thereof relative to the first surface of the supporting member.

According to the electro-optic apparatus described above, the adjuster allows the reflective polarizing plate apparatus to pivot in the plane thereof relative the first surface of the supporting member so that the reflective polarizing plate is angularly adjusted relative to the reflective light modulating device. The reflective polarizing plate can thus be angularly adjusted relative to the reflective light modulating device, whereby the polarization angle with respect to the reflective light modulating device can be optimized, and hence the second linearly polarized light can be reflected with loss of light reduced. Further, the difference between maximum and minimum contrast can be reduced. As a result, the contrast will not vary greatly but can be improved.

Application Example 11

In the electro-optic apparatus according to the application example described above, it is preferable that the adjuster includes engaging portions that are formed on the supporting member and the holding member and allow the holding member to pivot and a fixing portion that fixes the holding member to the supporting member.

According to the electro-optic apparatus described above, the holding member can be allowed to pivot by allowing the engaging portion formed on the supporting member to move along the engaging portion formed on the holding member, whereby the reflective polarizing plate can be angularly adjusted relative to the reflective light modulating device. Further, after the adjustment, the holding member can be fixed to the supporting member. The reflective polarizing plate can therefore be reliably adjusted and fixed.

Application Example 12

An optical apparatus according to this application example includes the electro-optic apparatus according to any of the application examples described above provided for each of red, green, and blue three color light fluxes and a cross dichroic prism that has surfaces on which the corresponding electro-optic apparatus are disposed, combines the image light fluxes modulated and outputted by the electro-optic apparatus, and outputs the combined image light.

According to the optical apparatus described above, the electro-optic apparatus for the color light fluxes, in each of which the reflective polarizing plate can be angularly adjusted relative to the reflective light modulating device, are disposed on the corresponding surfaces of the cross dichroic prism so that color image light fluxes are combined. The configuration described above allows the contrast of the combined image light to be improved. Further, since the quality of each of the reflective polarizing plates will not be degraded, the contrast can be maintained.

Application Example 13

In the optical apparatus according to the application example described above, it is preferable that the first biasing members in the reflective polarizing plate apparatus used in the electro-optic apparatus have the same shape including a substantially trapezoidal opening that ensures a predetermined effective region.

According to the optical apparatus described above, the orientations of the substantially trapezoidal openings of the first biasing members in the reflective polarizing plate apparatus differ from one another (the orientations for green light and blue light differ from the orientation for red light, for example). However, the first biasing members having a common shape can be disposed in the holding members, for example, by vertically reversing the first biasing members (rotating first biasing members in the planes thereof by 180 degrees) as necessary. As a result, die and other costs of the first biasing members can be reduced, as compared with a case where the first biasing members have different shapes for the color light fluxes.

Application Example 14

A projector according to this application example includes the optical apparatus according to any of the application examples described above.

Since the projector described above is so configured that each of the reflective polarizing plates can be angularly adjusted relative to the corresponding reflective light modulating device, that the quality of the reflective polarizing plates will not be degraded, and that the reflective polarizing plates can be reliably fixed, the contrast of a projected image can be improved and the contrast can be maintained even when an impact or vibration is applied.

BRIEF DESCRIPTION OF THE DRAWINGS

The invention will be described with reference to the accompanying drawings, wherein like numbers reference like elements.

FIGS. 3A and 3B are perspective views showing an electro-optic apparatus for B light.

DESCRIPTION OF EXEMPLARY EMBODIMENTS

Embodiments will be described below with reference to the drawings.

First Embodiment

Figure 1:
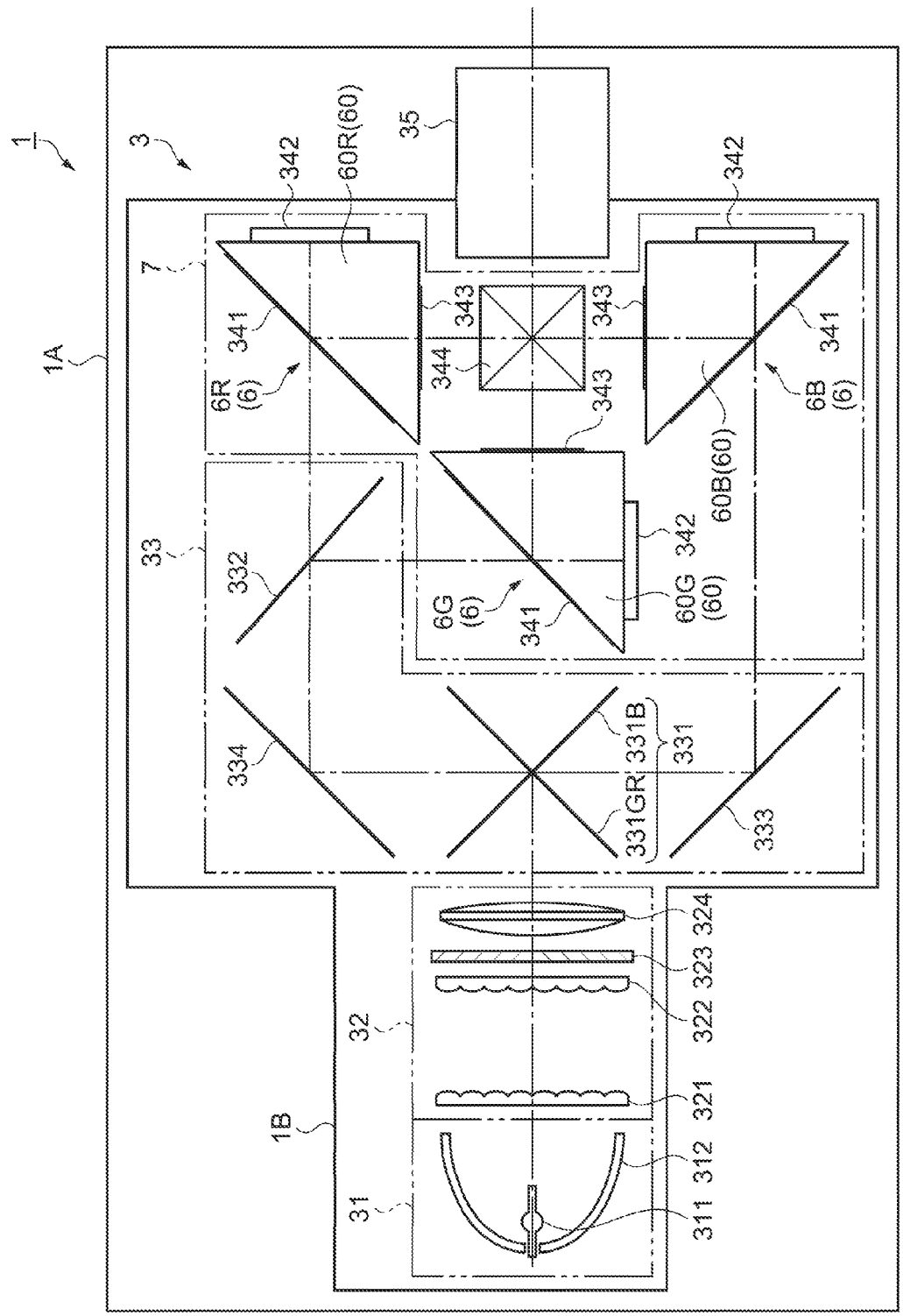
FIG. 1 diagrammatically shows a schematic configuration of a projector according to a first embodiment.

FIG. 1 diagrammatically shows a schematic configuration of a projector 1 according to a first embodiment. The configuration and operation of the optical system of the projector 1 will be briefly described with reference to FIG. 1.

The projector 1 according to the present embodiment modulates a light flux emitted from a light source in accordance with image information (image signal) to form image light and projects the image light on a screen or any other surface. The projector 1 includes an exterior housing 1A that forms the exterior, an optical unit 3 including a light source apparatus 31 and other components, a controller (not shown), a power supply (not shown) that supplies electric power to the light source apparatus 31, the controller, and other components, and a cooling fan (not shown) that cools the interior of the projector 1, as shown in FIG. 1.

The controller includes a CPU (central processing unit), a ROM (read only memory), and a RAM (random access memory), functions as a computer, and controls the operation of the projector 1, for example, controls image projection-related operation.

The optical unit 3 optically processes a light flux having exited from the light source apparatus 31 under the control of the controller to form image light according to image information and projects the image light. The optical unit 3, which includes the light source apparatus 31, further includes an illumination optical apparatus 32, a color separation optical apparatus 33, an optical apparatus 7, a projection lens 35, and an optical part housing 1B that places the optical parts 31, 32, 33, 7, and 35 in predetermined positions along the optical path.

The light source apparatus 31 includes a light source 311 and a reflector 312, and the light source 311 is formed of an ultrahigh pressure mercury lamp, a metal halide lamp, or any other discharge-type lamp. In the light source apparatus 31, the reflector 312 aligns the directions of light fluxes emitted from the light source 311 with one another and directs the aligned light fluxes toward the illumination optical apparatus 32.

The illumination optical apparatus 32 includes a first lens array 321, a second lens array 322, a polarization conversion element 323, and a superimposing lens 324. The first lens array 321 has a plurality of lenslets arranged in a matrix and divides the light flux having exited from the light source apparatus 31 into a plurality of light fluxes. The second lens array 322 has substantially the same configuration as that of the first lens array 321. The second lens array 322 along with the superimposing lens 324 substantially superimposes the light fluxes on the surface of each reflective light modulating device 342, which will be described later. The polarization conversion element 323 has a function of aligning randomly polarized light fluxes having exited through the second lens array 322 with one another to form first linearly polarized light useable by the reflective light modulating devices 342. In the present embodiment, the polarization conversion element 323 provides S-polarized light, which is advantageous in that the magnitude thereof does not greatly decrease in the color separation optical apparatus 33, as the first linearly polarized light.

The color separation optical apparatus 33 includes a cross dichroic prism 331, a G-light reflecting dichroic mirror 332, and reflection mirrors 333 and 334 and has a function of separating the light flux having exited from the illumination optical apparatus 32 (S-polarized light) into three color light fluxes, a red light flux (hereinafter referred to as "R light"), a green light flux (hereinafter referred to as "G light"), and a blue light flux (hereinafter referred to as "B light").

The cross dichroic prism 331 has a B-light reflecting dichroic mirror 331B and a GR-light reflecting dichroic mirror 331GR disposed in an X-like shape. The cross dichroic prism 331 separates the incident light flux having exited from the illumination optical apparatus 32 in such a way that the B-light reflecting dichroic mirror 331B reflects the B light and the GR-light reflecting dichroic mirror 331GR reflects the G light and the R light.

The B light reflected off the B-light reflecting dichroic mirror 331B is reflected off the reflection mirror 333 toward an electro-optic apparatus 6B, which will be described later. On the other hand, the G light and the R light reflected off the GR-light reflecting dichroic mirror 331GR are reflected off the reflection mirror 334 and then incident on the G-light reflecting dichroic mirror 332.

The G-light reflecting dichroic mirror 332 separates the G and R light reflected off the reflection mirror 334 and incident on the dichroic mirror 332 from each other in such a way that the dichroic mirror 332 reflects the G light and transmits the R light. The G light reflected off the G-light reflecting dichroic mirror 332 is directed toward an electro-optic apparatus 6G, which will be described later, and the R light having passed through the G-light reflecting dichroic mirror 332 is directed toward an electro-optic apparatus 6R, which will be described later.

The optical apparatus 7 includes the electro-optic apparatus 6 provided for the three color light fluxes (reference character 6R denotes electro-optic apparatus for R light, reference character 6G denotes electro-optic apparatus for G light, and reference character 6B denotes electro-optic apparatus for B light) and a cross dichroic prism 344 as a light combining optical apparatus. The optical apparatus 7 modulates the color light fluxes separated by the color separation optical apparatus 33 in accordance with image information to form image light.

Each of the electro-optic apparatus 6 includes a reflective polarizing plate 341 (reflective polarizing plate apparatus 5), a reflective light modulating device 342, a polarizing plate and a supporting member 60. The reflective polarizing plate 341 has a wire-grid-type polarizing plate configuration in which a large number of fine linear ribs made, for example, of aluminum are arranged in parallel to each other on a glass substrate. The reflective polarizing plate 341 transmits light polarized in the direction perpendicular to the direction in which the linear ribs extend whereas reflecting light polarized in the direction parallel to the direction in which the linear ribs extend.

The reflective polarizing plate 341 in the present embodiment transmits the first linearly polarized light (S-polarized light in the present embodiment) provided by the polarization conversion element 323 whereas reflecting second linearly polarized light (P-polarized light in the present embodiment) polarized in a direction substantially perpendicular to the direction in which the first linearly polarized light is polarized. Alternatively, a retardation plate may be disposed somewhere along the optical path in front of the reflective polarizing plate 341. In this case, the reflective polarizing plate 341 transmits the second linearly polarized light whereas reflecting the first linearly polarized light.

The reflective light modulating device 342 is formed of a reflective, high-temperature polysilicon TFT liquid crystal panel or what is called LCOS (liquid crystal on silicon) in which substrates facing each other sandwich a liquid crystal layer.

The reflective light modulating device 342 modulates color light that is the first linearly polarized light having passed through the reflective polarizing plate 341 and reflects the modulated color light toward the reflective polarizing plate 341. The color light, which is the second linearly polarized light modulated by the reflective light modulating device 342 and reflected toward the reflective polarizing plate 341, is reflected off the reflective polarizing plate 341. The reflective light modulating device 342 provides P-polarized light as the second linearly polarized light in the present embodiment.

The polarizing plate 343 transmits the second linearly polarized light reflected off the reflective polarizing plate 341. That is, even when the light flux reflected off the reflective polarizing plate 341 contains polarized light having polarization components other than the predetermined one, the polarizing plate 343 contributes to improvement in contrast of an image because it removes the polarization components other than the predetermined one.

The supporting member 60 is provided for each of the color light fluxes (reference character 60R denotes supporting member for R light, reference character 60G denotes supporting member for G light, and reference character 60B denotes supporting member for B light) and supports the corresponding reflective polarizing plate 341, reflective light modulating device 342, and polarizing plate 343. The reflective polarizing plate 341 is disposed in a holding member 50, which will be described later, and the supporting member 60 supports the holding member 50 to indirectly support the reflective polarizing plate 341. The positions of the electro-optic apparatus 6 are adjusted and fixed with respect to the projection lens 35 and the cross dichroic prism 344, which have been positioned in advance. How to adjust the positions of the electro-optic apparatus 6 will be described below.

The cross dichroic prism 344 combines the color light fluxes modulated by the electro-optic apparatus 6 to form image light representing a color image. The cross dichroic prism 344 is formed by bonding four rectangular prisms and thus has a substantially square shape in a plan view. A pair of dielectric multilayer films are formed along the interfaces between the bonded rectangular prisms. In the cross dichroic prism 344, the dielectric multilayer films reflect the R and B light modulated by the electro-optic apparatus 6R and 6B whereas transmitting the G light modulated by the electro-optic apparatus 6G to combine the color light fluxes.

The projection lens 35 is formed as a combined lens obtained by combining a plurality of lenses and projects the image light formed by the optical apparatus 7 on a screen.

Figures 2A, 2B:
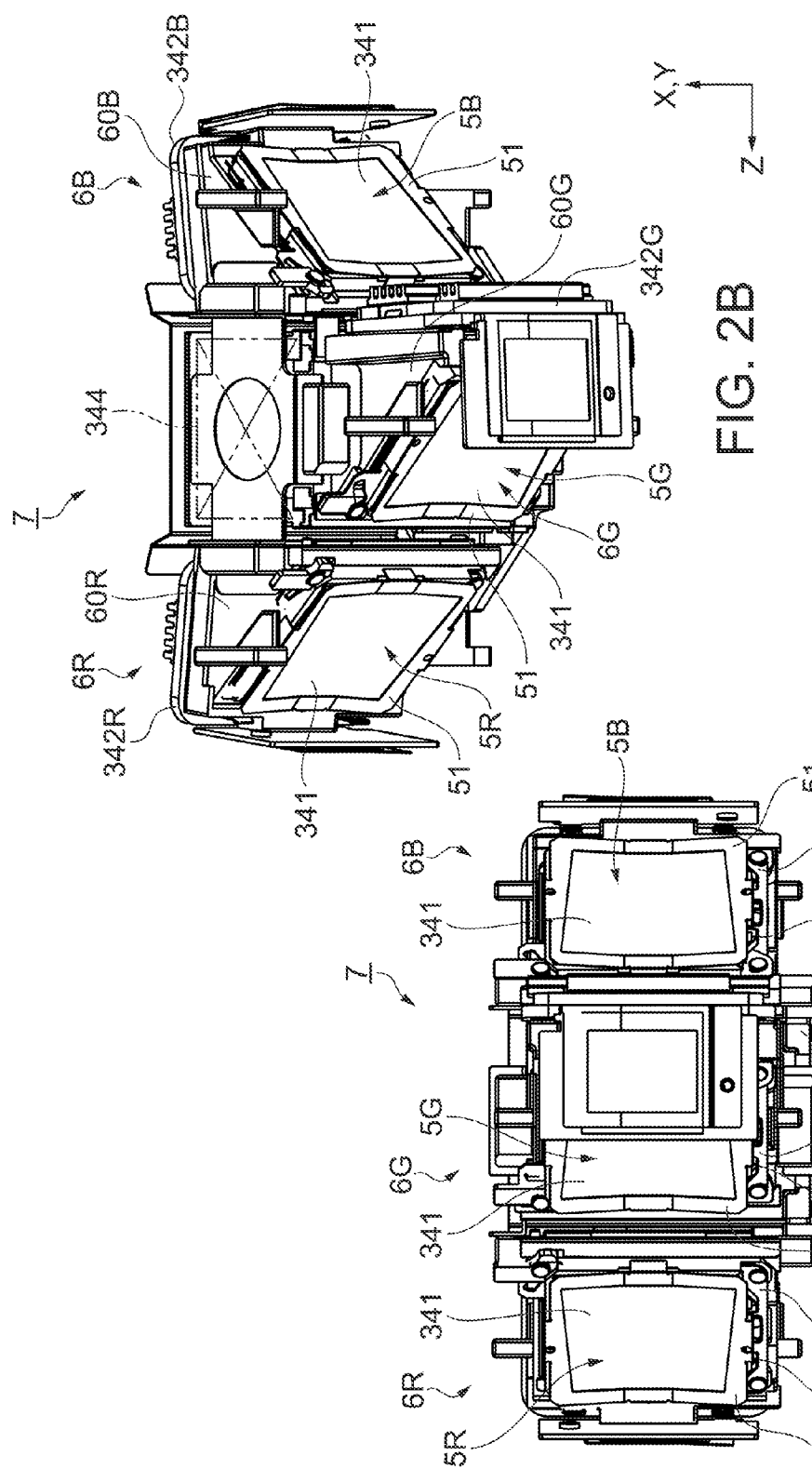
FIGS. 2A and 2B are perspective views showing an optical apparatus.

FIGS. 2A and 2B are perspective views showing the optical apparatus 7. FIG. 2A is a plan view of the optical apparatus 7 viewed in a −X direction, and FIG. 2B is a perspective view of the optical apparatus 7. In the following figures, an XYZ orthogonal coordinate system is used for convenience of description. Specifically, an X direction (+X direction) is a direction in which the electro-optic apparatus 6G for G light outputs a light flux, a Z direction (+Z direction) is a direction in which the electro-optic apparatus 6B for B light outputs a light flux, and a Y direction (+Y direction) is a direction perpendicular to the X and Z directions and oriented upward in FIG. 2A. The following definitions are also used as appropriate: The +Y direction is oriented upward (−Y direction is oriented downward), and the +X direction is oriented forward (−X direction is oriented rearward).

The optical apparatus 7 is formed of the three electro-optic apparatus 6 (6R, 6G, and 6B) corresponding to the color light fluxes, the cross dichroic prism 344, which fixes the three electro-optic apparatus 6 to the respective light-incident surfaces thereof that are adjacent and perpendicular to each other, and a fixing mount 9, which fixes the cross dichroic prism 344, as shown in FIGS. 2A and 2B.

Figure 4:
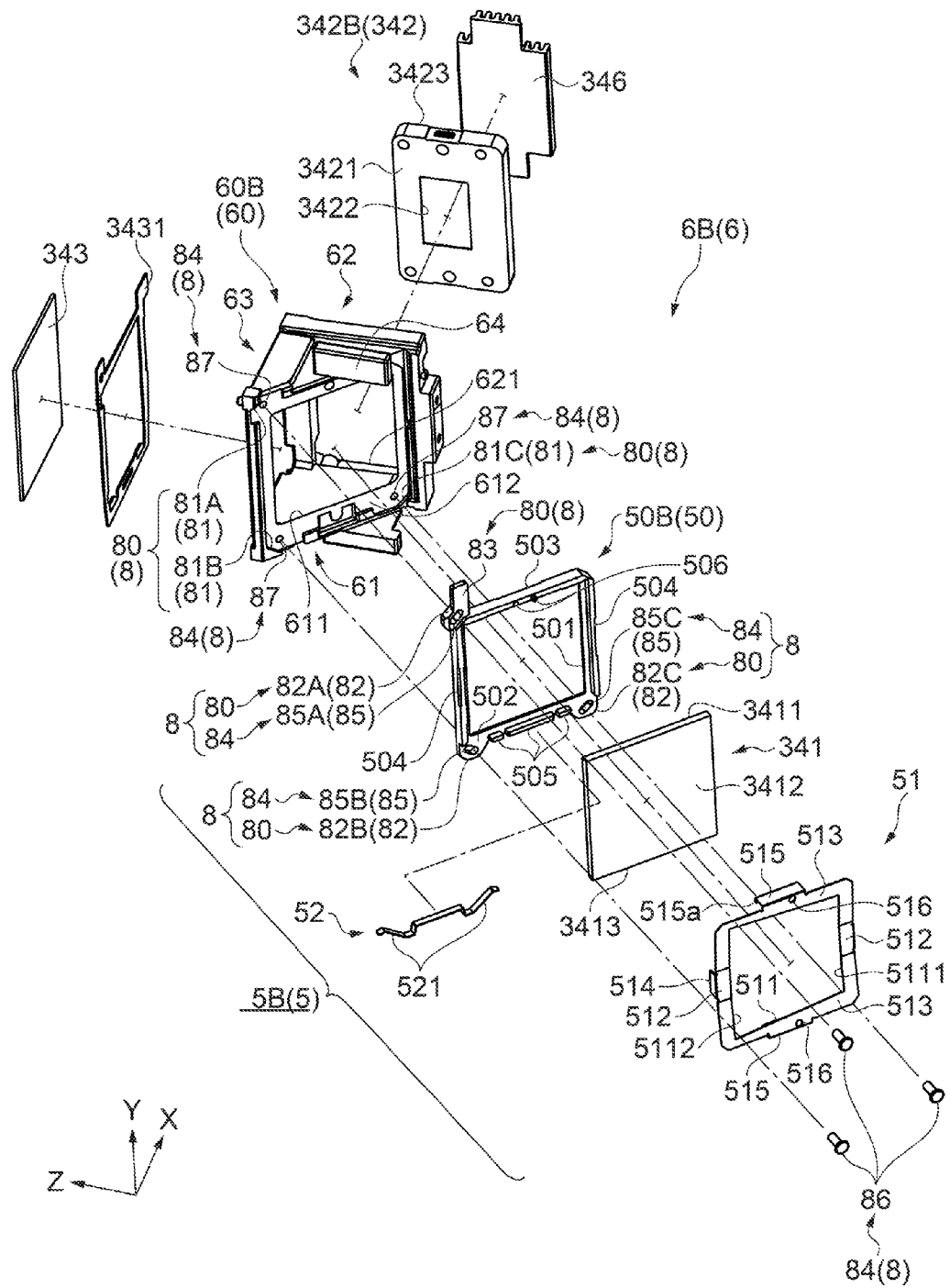
FIG. 4 is an exploded perspective view of the electro-optic apparatus for B light.

FIGS. 3A and 3B are perspective views showing the electro-optic apparatus 6B for B light and obtained by viewing the electro-optic apparatus 6B in different directions. FIG. 4 is an exploded perspective view of the electro-optic apparatus 6B for B light. The electro-optic apparatus 6R for R light, the electro-optic apparatus 6G for G light, and the electro-optic apparatus 6B for B light are formed of substantially the same components and configured in substantially the same manner. In the following description, the configuration and operation of the electro-optic apparatus 6 will therefore be described with reference to the electro-optic apparatus 6B for B light.

The electro-optic apparatus 6B (6) includes the supporting member 60B (60), the reflective light modulating device 342B (342), the reflective polarizing plate apparatus 5B (5), and the polarizing plate 343, as shown in FIGS. 3A, 3B, and 4. The reflective polarizing plate apparatus 5 is provided for each of the color light fluxes, and reference character 5R denotes a reflective polarizing plate apparatus for R light, reference character 5G denotes a reflective polarizing plate apparatus for G light, and reference character 5B denotes a reflective polarizing plate apparatus for B light in the following description.

The supporting member 60B has a substantially triangularly columnar frame-like shape. The supporting member 60B has a first surface 61 that supports the reflective polarizing plate 341, a second surface 62 that supports the reflective light modulating device 342B, and a third surface 63 that supports the polarizing plate 343. The first surface 61 is inclined by about 45 degrees to the optical axis of the B light provided from the color separation optical apparatus 33. The second surface 62 and the third surface 63 are substantially perpendicular to each other with the first surface 61 therebetween. The supporting member 60B therefore has a frame-like shape of a substantially regular triangular column.

The reflective polarizing plate 341 is incorporated in the reflective polarizing plate apparatus 5B, which will be described later, and supported by and fixed to the first surface 61 via a holding member 50B, as shown in FIG. 4. The holding member 50 is provided for each of the color light fluxes, and reference character 50R denotes a holding member for R light, reference character 50G denotes a holding member for G light, and reference character 50B denotes a holding member for B light in the following description.

Figure 5:
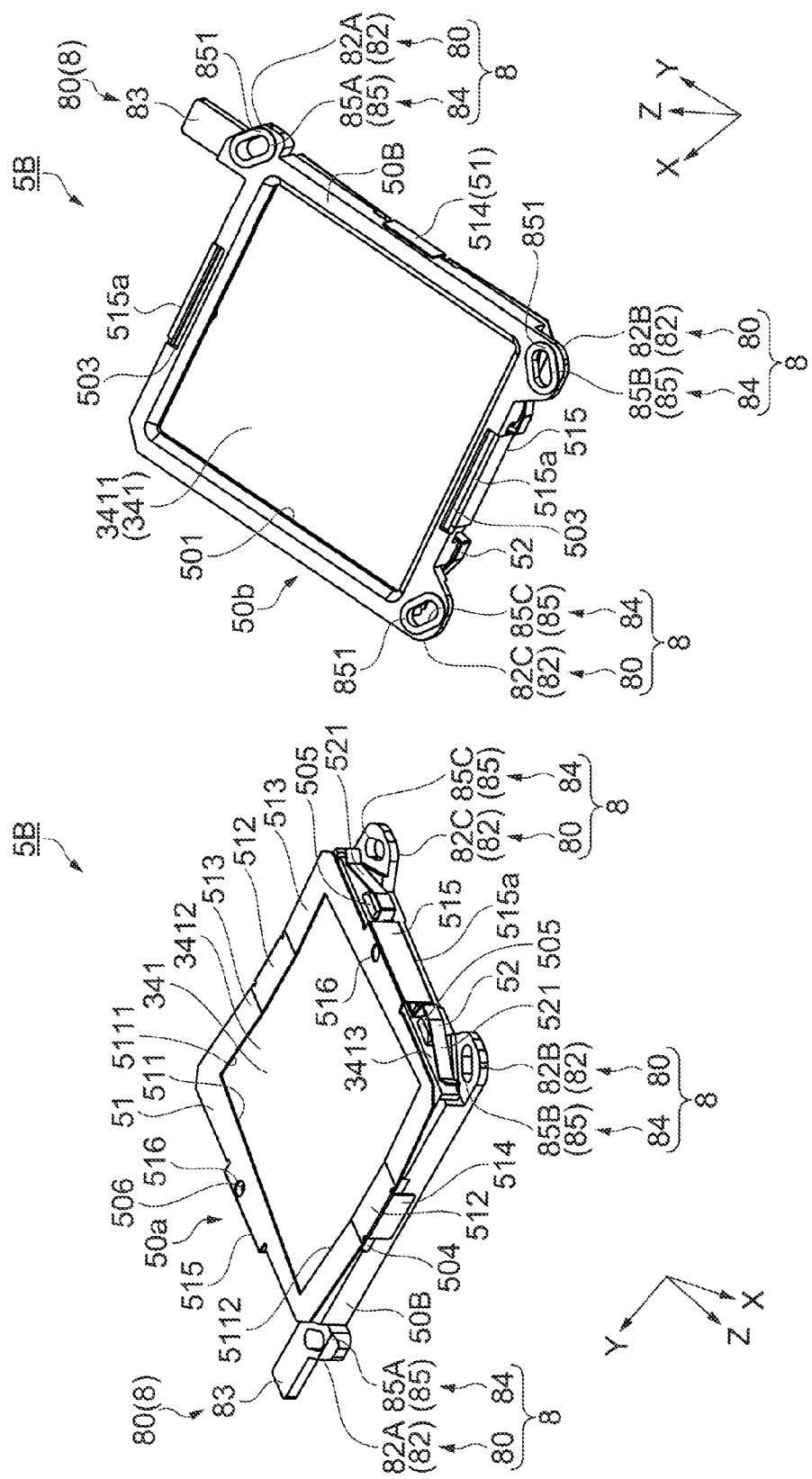
FIGS. 5A and 5B are perspective views showing a reflective polarizing plate apparatus for B light.

FIGS. 5A and 5B are perspective views showing the reflective polarizing plate apparatus 5B for B light. FIG. 5A is a perspective view of the reflective polarizing plate apparatus 5B viewed in the direction in which the first linearly polarized light is incident on the reflective polarizing plate 341, and FIG. 5B is a perspective view of the reflective polarizing plate apparatus 5B viewed in the direction in which the first linearly polarized light incident on the reflective polarizing plate 341 passes therethrough. The configuration and operation of the reflective polarizing plate apparatus 5B will be described with reference to FIGS. 4, 5A, and 5B.

The following definitions are used as appropriate: The side of the reflective polarizing plate apparatus 5B on which the first linearly polarized light is incident is a front side 50a as shown in FIG. 5A, and the side of the reflective polarizing plate apparatus 5B through which the first linearly polarized light passes is a rear side 50b as shown in FIG. 5B. Rightward and leftward directions are also defined with reference to a side facing the front side 50a in FIGS. 4, 5A, and 5B.

The reflective polarizing plate apparatus 5B includes the holding member 50B, the reflective polarizing plate 341, and a first biasing member 51, and a second biasing member 52, as shown in FIG. 4.

The holding member 50B is not only a member that accommodates and holds the reflective polarizing plate 341 but also a member that is used to angularly adjust the reflective polarizing plate 341 relative to the reflective light modulating device 342B. The holding member 50B has a substantially rectangular shape and has an opening 501 formed in a substantially central portion. The holding member 50B further has a recess 502 formed around the opening 501, and the recess 502 is recessed from the outer circumference and accommodates the reflective polarizing plate 341.

A pair of engaging grooves 503 that engage with the first biasing member 51 are formed in central portions of the upper and lower outer edges on the rear side 50b of the holding member 50B, as shown in FIG. 5B. A pair of guiding grooves 504 are formed in central portions of the right and left outer edges on the front side 50a of the holding member 50B, and the guiding grooves 504 guide positioning pieces 514 of the first biasing member 51, which will be described later, as shown in FIG. 5A. Further, a plurality of guiding protrusions 505 that protrude in the −Y direction and guide the second biasing member 52 are formed on the recess 502.

Further, two cylindrical direction regulators 506 that protrude on the front side 50a are formed in a central portion of the +Y-direction-side edge of the holding member 50B, as shown in FIG. 4. The direction regulators 506 serve to determine the orientation of the first biasing member 51, which will be described later. The holding member 50 in the present embodiment, which has the two direction regulators 506, is so configured that only the right direction regulator 506 is used but the left direction regulator 506 is not used. In the present embodiment, the holding member 50B is formed of a metal member made, for example, of aluminum, and the recess 502 is formed in a cutting process as a secondary manufacturing process. In the secondary manufacturing process step, the direction regulator 506 that is not used is removed.

Three corners of the holding member 50B form adjusters 8 that angularly adjust the reflective polarizing plate 341 in the plane thereof relative to the reflective light modulating device 342B. The adjusters 8 are formed of components of the holding member 50B and components of the supporting member 60B, and each of the adjusters 8 includes an engaging portion 80 that allows the holding member 50B to pivot relative to the supporting member 60B (reflective light modulating device 342B) and a fixing portion 84 that fixes the holding member 50B to the supporting member 60B.

As the engaging portions 80 that form the adjusters 8, the holding member 50B includes three outer circumferential surface portions for adjustment 82 (first outer circumferential surface portion 82A, second outer circumferential surface portion 82B, and third outer circumferential surface portion 82C) that form the outer circumferential surfaces of the three corners of the holding member 50B. The first outer circumferential surface portion 82A, the second outer circumferential surface portion 82B, and the third outer circumferential surface portion 82C are formed of concentric curved surfaces around the center of the opening 501. Further, a protrusion for adjustment 83 is so formed that it protrudes upward from an upper portion of the first outer circumferential surface portion 82A. The protrusion for adjustment 83 is grasped when the reflective polarizing plate 341 is angularly adjusted.

The three outer circumferential surface portions for adjustment 82 are guided along three guiding surface portions for adjustment 81 (first guiding surface portion 81A, second guiding surface portion 81B, and third guiding surface portion 81C) as the engaging portions 80 that are formed on the first surface 61 of the supporting member 60B and will be described later. As the fixing portions 84 that form the adjusters 8, the holding member 50B has elongated through holes for fixation 85 (first elongated hole 85A, second elongated hole 85B, and third elongated hole 85C) that are formed concentrically around the center of the opening 501 and located in the vicinity of the first outer circumferential surface portion 82A, the second outer circumferential surface portion 82B, and the third outer circumferential surface portion 82C, respectively. The elongated holes for fixation 85 are used when the holding member 50B is fixed to the first surface 61 after the reflective polarizing plate 341 is adjusted.

The first biasing member 51 cooperates with the holding member 50B to bias from the front side 50a a flat surface of the reflective polarizing plate 341 accommodated in the holding member 50B (glass surface 3412, which will be described later, of reflective polarizing plate 341 in the present embodiment). The first biasing member 51 also has a light-blocking capability and blocks a light flux incident on the region outside an opening 511, which will be described later. The first biasing member 51 is formed by bending an elastic plate-shaped metal member. The first biasing member 51 has a substantially rectangular shape and has the opening 511 formed in a substantially central portion thereof. The opening 511 has a substantially trapezoidal shape. Each side of the opening 511 is formed to be substantially linear, and no cutout, protrusion, or any other shape is formed along each side.

The trapezoidal shape of the opening 511 is what is called an isosceles trapezoid, as shown in FIGS. 3A, 3B, and 4. It is assumed in FIG. 4 that the shorter one of the right and left sides facing and parallel to each other is what is called an upper base 5111, and the longer side is what is called a lower base 5112. In this case, the upper base 5111 is located on the right, and the lower based 5112 is located on the left.

First springs 512 are formed in central portions on the right and left sides of the first biasing member 51, and second springs 513 inclined in a direction that separates away from the front side 50a with distance from the first springs 512 are formed on both sides of the first springs 512 or on the upper and lower sides of the first biasing member 51. A pair of positioning pieces 514 bent toward the rear side 50b extend from the right and left first springs 512. Further, a pair of engaging pieces 515 bent toward the rear side 50b extend from central portions on the upper and lower sides of the first biasing member 51 (central portions of upper and lower second springs 513). A pair of hooking portions 515a are formed along the front ends of the engaging pieces 515. Holes 516 that determine the orientation of the first biasing member 51 fixed to the holding member 50B are formed in the upper and lower second springs 513 in positions in the vicinity of the engaging pieces 515 and slightly to the right of the central portions of the second springs 51 (close to upper base 5111).

The second biasing member 52 cooperates with the holding member 50B to bias a side surface of the reflective polarizing plate 341 (lower surface 3413, which will be describe later, of reflective polarizing plate 341 in present embodiment) accommodated in the holding member 50B. The second biasing member 52 is formed by bending an elastic plate-shaped metal member. The second biasing member 52 has a band-like shape and a symmetrical, substantially W-like cross-sectional shape. Two springs 521 that press the side surface of the reflective polarizing plate 341 are formed on both ends of the second biasing member 52.

Assembly of the reflective polarizing plate apparatus 5B will be described with reference to FIGS. 4, 5A, and 5B.

The second biasing member 52 is first inserted into the grooves between the guiding protrusions 505 of the holding member 50B. The reflective polarizing plate 341 is then inserted from the front side 50a into the recess 502 of the holding member 50B. The insertion is so performed that a functional surface 3411 of the reflective polarizing plate 341 (surface on which wire grid is formed) faces the accommodating portion of the holding member 50B (recess 502), and that the lower surface 3413 of the reflective polarizing plate 341 presses the two springs 521 of the second biasing member 52 downward against the springs 521.

When inserted, the reflective polarizing plate 341 is pressed by the second biasing member 52 sideways (from the side where lower surface 3413 is present) and supported and fixed in the recess 502, as shown in FIG. 5A. Specifically, the reflective polarizing plate 341 is so supported and fixed that it is pressed by the springs 521 of the second biasing member 52 in the direction perpendicular to the lower surface 3413. The functional surface 3411 of the reflective polarizing plate 341 faces the rear side 50b and is exposed through the opening 501, as shown in FIG. 5B.

The first biasing member 51 is then placed on the holding member 50B. The first biasing member 51 is so placed by inserting the direction regulator 506 of the holding member 50B into the corresponding hole 516 of the first biasing member 51 that the first springs 512 come into contact with the reflective polarizing plate 341 and the positioning pieces 514 catch the guiding grooves 504. The engaging pieces 515 are then pressed toward the engaging grooves 503 against the biasing force of the second springs 513, and the hooking portions 515a are hooked to the engaging grooves 503, as shown in FIG. 5B.

The reflective polarizing plate 341 is thus so supported and fixed in the recess 502 that the surface facing away from the functional surface 3411 (glass surface 3412) is pressed from the front side 50a by the first springs 512 of the first biasing member 51, as shown in FIG. 5A. Specifically, the reflective polarizing plate 341 is so supported and fixed that it is pressed by the first springs 512 of the first biasing member 51 in the direction perpendicular to the glass surface 3412. The glass surface 3412 of the reflective polarizing plate 341 faces the front side 50a and is exposed through the trapezoidal opening 511 of the first biasing member 51. FIG. 5A shows a state before the engaging pieces 515 (hooking portions 515a) of the first biasing member 51 are hooked to the engaging grooves 503 of the holding member 50.

The assembly of the reflective polarizing plate apparatus 5B is thus completed. In the reflective polarizing plate apparatus 5B, the reflective polarizing plate 341 is so supported and fixed that the first biasing member 51 biases a flat surface (glass surface 3412) and the second biasing member 52 biases a side surface (lower surface 3413).

The configuration of the electro-optic apparatus 6B will next be described with reference to FIGS. 3A, 3B, and 4.

The supporting member 60B, which forms the electro-optic apparatus 6B, has the first surface 61, the second surface 62, and the third surface 63 and has a frame-like shape of a substantially regular triangular column, as described above. The first surface 61 pivotally supports and fixes the reflective polarizing plate apparatus 5B, as described above. The second surface 62 supports and fixes the reflective light modulating device 342B. The third surface 63 supports and fixes the polarizing plate 343.

The first surface 61 has a rectangular opening 611 and a receiver 612 through which the opening 611 is formed. Three corners of the outer circumference of the receiver 612 form the adjusters 8, which angularly adjust the reflective polarizing plate 341 in the plane thereof relative to the reflective light modulating device 342B. The supporting member 60B includes the three guiding surface portions for adjustment 81 (first guiding surface portion 81A, second guiding surface portion 81B, and third guiding surface portion 81C) as the engaging portion 80 that forms the adjusters 8. The guiding surface portions for adjustment 81 correspond to the three outer circumferential surface portions for adjustment 82 (first outer circumferential surface portion 82A, second outer circumferential surface portion 82B, and third outer circumferential surface portion 82C) of the holding member 50B and can slide along the outer circumferential surface portions for adjustment 82.

Further, the supporting member 60B has threaded holes 87 as the fixing portions 84 that form the adjusters 8. The threaded holes 87 are formed in the receiver 612 in the vicinity of the first guiding surface portion 81A, the second guiding surface portion 81B, and the third guiding surface portion 81C. The threaded holes 87 are used when the holding member 50B is fixed to the first surface 61 after the reflective polarizing plate 341 is adjusted.

To place the reflective polarizing plate apparatus 5B on the first surface 61 of the supporting member 60B, the receiver 612 is allowed to come into contact with the rear side 50b of the holding member 50B in such away that the three outer circumferential surface portions for adjustment 82 formed on the holding member 50B of the reflective polarizing plate apparatus 5B correspond to the three guiding surface portions for adjustment 81 formed on the first surface 61, as shown in FIG. 4.

Specifically, the reflective polarizing plate apparatus 5B is so placed on the supporting member 60B that the first guiding surface portion 81A corresponds to the first outer circumferential surface portion 82A, the second guiding surface portion 81B corresponds to the second outer circumferential surface portion 82B, and the third guiding surface portion 81C corresponds to the third outer circumferential surface portion 82C. To allow the rear side 50b of the holding member 50B to come into contact with the receiver 612, convex portions 851 formed by raising portions around the elongated holes for fixation 85 are allowed to come into contact with the receiver 612, as shown in FIG. 5B. As a result, the functional surface 3411 of the reflective polarizing plate 341 is supported by and fixed to the first surface 61 and faces the reflective light modulating device 342.

The second surface 62 has a rectangular opening 621 and a receiver (not show) formed therein. A front surface 3421 of the reflective light modulating device 342B is placed in the receiver. The front surface 3421 of the reflective light modulating device 342B has an opening 3422 formed therein. The opening 3422 serves as a rectangular effective region on which a light flux is incident and through which the light flux exits. A heat sink 346 that dissipates heat generated in the reflective light modulating device 342B is provided on a rear surface 3423 of the reflective light modulating device 342B. A flexible substrate (not shown) extends from a side surface of the reflective light modulating device 342B and is connected to a circuit substrate (not shown) in the projector 1, and an image signal for driving the reflective light modulating device 342B is inputted to the flexible substrate.

The third surface 63 has a rectangular opening (not shown) and a receiver (not shown) formed therein. The polarizing plate 343 is placed in the receiver. Specifically, the polarizing plate 343 is fixed to a holding plate 3431 that allows the polarizing plate 343 to be held and adjusted, and the holding plate 3431 is placed in the receiver of the third surface 63.

How the adjusters 8 make adjustment will next be described with reference to FIGS. 3A, 3B, and 4.

The adjustment made by the adjusters 8 in the electro-optic apparatus 6B is made by allowing the reflective polarizing plate apparatus 5B (reflective polarizing plate 341) to pivot in the plane thereof relative to the reflective light modulating device 342B and adjusting the pivotal angle. In addition to the adjusters 8, the polarizing plate 343 is also adjusted by allowing the polarizing plate 343 to pivot in the plane thereof relative to the reflective light modulating device 342B, and the pivotal angle is adjusted. The adjustment improves the contrast of the image light formed of B light finally outputted from the electro-optic apparatus 6B.

In the method for adjusting the reflective polarizing plate apparatus 5B using the adjusters 8 in the electro-optic apparatus 6B, after the reflective polarizing plate apparatus 5B is placed on the first surface 61 as described above, a light flux traveling along the optical axis (in the direction inclined to the reflective polarizing plate apparatus 5B by about 45 degrees) is allowed to be incident on the reflective polarizing plate apparatus 5B with the reflective light modulating device 342B operating in a fully black mode. The protrusion for adjustment 83 of the holding member 50B is then grasped and allowed to pivot in parallel to the first surface 61. The pivotal motion allows the three outer circumferential surface portions for adjustment 82 to slide along and pivot relative to the guiding surface portions for adjustment 81 corresponding thereto. The adjustment is so made that the intensity of the light flux that exits from the electro-optic apparatus 6B is minimized. After the adjustment, the reflective polarizing plate apparatus 5B is fixed to the first surface 61 by inserting fixing screws 86 that form the fixing portions 84 into the elongated holes for fixation 85 and allowing the fixing screws 86 to engage with threaded holes 87 formed through the first surface 61.

The polarizing plate 343 is similarly adjusted. Specifically, the holding plate 3431, which holds the polarizing plate 343, is allowed to pivot in parallel to the third surface 63 by grasping the holding plate 3431 in such a way that the intensity of the light flux that exits from the electro-optic apparatus 6B is minimized. After the adjustment, the holding plate 3431 is fixed to the third surface 63, for example, with an adhesive.

The behavior of the B light in the thus assembled and adjusted electro-optic apparatus 6B will be described with reference to FIG. 4.

The B light polarized by the illumination optical apparatus 32 in the same direction as that of the first linearly polarized light (S-polarized light in the present embodiment) is incident on the reflective polarizing plate apparatus 5B. Specifically, the B light passes through the trapezoidal opening 511 of the first biasing member 51 and is incident on the glass surface 3412, which faces away from the functional surface 3411 of the reflective polarizing plate 341.

The B light incident on the reflective polarizing plate 341 passes through the reflective polarizing plate 341. The transmitted B light travels in the supporting member 60B from the first surface 61 to the second surface 62 and is incident on the reflective light modulating device 342B disposed substantially perpendicular to the transmitted B light. In this process, the B light passing through the trapezoidal opening 511 of the first biasing member 51 has a rectangular shape corresponding to the rectangular opening 3422 of the reflective light modulating device 342B and is incident and superimposed on the reflective light modulating device 342B.

The reflective light modulating device 342B modulates the B light incident through the opening 3422 in accordance with an image signal inputted via the flexible substrate. The modulated B light is polarized in the same direction as that of the second linearly polarized light (P-polarized light in the present embodiment) and reflected (outputted) through the opening 3422 toward the reflective polarizing plate apparatus 5B.

The B light having exited from the reflective light modulating device 342B is incident on the reflective polarizing plate 341 through the opening 501. In this process, since the reflective polarizing plate 341 is so disposed that the functional surface 3411 thereof faces the reflective light modulating device 342B, the B light incident on the reflective polarizing plate 341 is reflected off the functional surface 3411 without entering the glass substrate.

The B light reflected off the functional surface 3411 is incident on the polarizing plate 343 disposed substantially perpendicular to the reflected B light. The polarizing plate 343 removes polarization components that are contained in the B light reflected off the functional surface 3411 but are not the polarization component that forms the P-polarized light, whereby only the P-polarized light passes through the polarizing plate 343.

The electro-optic apparatus 6B operates as described above.

Figure 6:
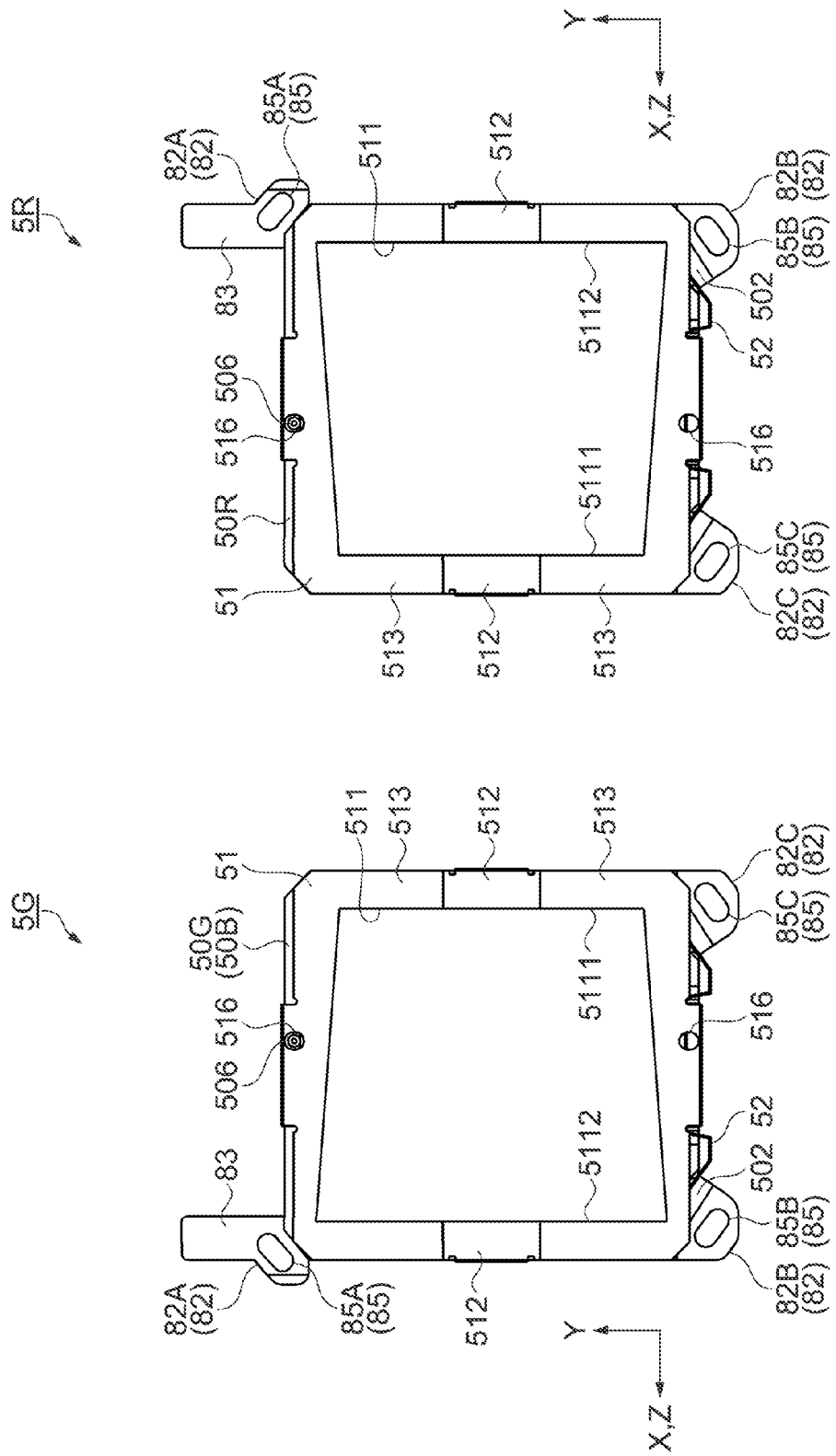
FIGS. 6A and 6B are front views showing reflective polarizing plate apparatus for G and R light.

FIGS. 6A and 6B are front views showing the reflective polarizing plate apparatus 5 for G and R light (5G and 5R). FIG. 6A is a front view showing the reflective polarizing plate apparatus 5G for G light, and FIG. 6B is a front view showing the reflective polarizing plate apparatus 5R for R light. How to place the first biasing members 51 used in the reflective polarizing plate apparatus 5 for the color light fluxes (5R, 5G, and 5B) will be described with reference FIGS. 1, 2A, 2B, 6A, and 6B.

The reflective polarizing plate apparatus 5G for G light has substantially the same configuration as that of the reflective polarizing plate apparatus 5B for B light in consideration of the relationship between the positions of the reflective polarizing plates 341 (reflective polarizing plate apparatus 5) along the optical path shown in FIG. 1 and differs therefrom in that the reflective light modulating device 342B for B light is replaced with the reflective light modulating device 342G for G light.

The first biasing member 51 used in the reflective polarizing plate apparatus 5G for G light is therefore disposed in the holding member 50G of the reflective polarizing plate apparatus 5G in the same direction (orientation) as that of the first biasing member 51 used in the reflective polarizing plate apparatus 5B for B light. Specifically, the opening 511 is so oriented that the upper base 5111 is located on the right and the lower base 5112 is located on the left, and the holes 516 are located to the right of the center of the opening 511 when viewed from the front, as shown in FIG. 6A.

The holding member 50G of the reflective polarizing plate apparatus 5G has the same configuration as that of the holding member 50B of the reflective polarizing plate apparatus 5B, and the secondary manufacturing process is also similarly performed. In the secondary manufacturing process, the left direction regulator 506 is removed.

The electro-optic apparatus 6G for G light also has substantially the same configuration as that of the electro-optic apparatus 6B for B light in consideration of the relationship between the positions of the reflective polarizing plates 341 (reflective polarizing plate apparatus 5), the reflective light modulating devices 342, and the polarizing plates 343 along the optical path shown in FIG. 1. The electro-optic apparatus 6G for G light is so configured that the reflective polarizing plate apparatus 5B for B light is replaced with the reflective polarizing plate apparatus 5G for G light and the reflective light modulating device 342B for B light is replaced with the reflective light modulating device 342G for G light.

The reflective polarizing plate apparatus 5R for R light has a configuration different from that of the reflective polarizing plate apparatus 5B for B light in consideration of the relationship between the positions of the reflective polarizing plates 341 (reflective polarizing plate apparatus 5) along the optical path shown in FIG. 1. They differ from each other in that the holding member 50R and the holding member 50B (50G) are bilaterally symmetrical. They further differ from each other in that the first biasing members 51 are also bilaterally symmetrical, and that the reflective light modulating device 342B for B light is replaced with the reflective light modulating device 342R for R light.

The first biasing members 51 disposed in the reflective polarizing plate apparatus 5B and 5R can be bilaterally symmetrical by rotating the first biasing member 51 of the reflective polarizing plate apparatus 5R in the plane of the first biasing member 51 by 180 degrees. When the first biasing member 51 is rotated, the opening 511 thereof is so oriented that the upper base 5111 is located on the left and the lower base 5112 is located on the right, and the holes 516 are located to the left of the center of the opening 511 when viewed from the front, as shown in FIG. 6B. The thus oriented first biasing member 51 is then placed in the holding member 50R of the reflective polarizing plate apparatus 5R.

Since the holding member 50R of the reflective polarizing plate apparatus 5R and the holding member 50B of the reflective polarizing plate apparatus 5B are bilaterally symmetrical as described above, the secondary manufacturing process of the holding member 50R is so carried out that the direction regulator 506 removed when the secondary manufacturing process of the holding member 50B for B light is carried out is not removed but the other direction regulator 506 is removed. Specifically, in the holding member 50R for R light, the right direction regulator 506 is removed.

The configuration of the electro-optic apparatus 6R for R light also slightly differs from that of the electro-optic apparatus 6B for B light in consideration of the relationship between the positions of the reflective polarizing plates 341 (reflective polarizing plate apparatus 5), the reflective light modulating devices 342, and the polarizing plates 343 along the optical path shown in FIG. 1. The electro-optic apparatus 6R for R light and the electro-optic apparatus 6B for B light are disposed substantially symmetrical with respect to the XY plane, as shown in FIG. 2A. The electro-optic apparatus 6R for R light is so configured that the reflective polarizing plate apparatus 5B for B light is replaced with the reflective polarizing plate apparatus 5R for R light and the reflective light modulating device 342B for B light is replaced with the reflective light modulating device 342R for R light.

In the present embodiment, the common first biasing member 51 is used by rotating it in the plane thereof by 180 degrees as necessary depending on the positional relationship along the optical path. In other words, the first biasing members 51 used in the reflective polarizing plate apparatus 5 for the color light fluxes have the same shape.

In the reflective polarizing plate apparatus 5 for each of the color light fluxes, to correctly place the first biasing member 51 on the holding member 50, the holes 516 are provided in positions shifted from the center of the first biasing member 51 and close to the upper base 5111 so that the direction regulator 506 that has not been removed in the secondary manufacturing process of the holding member 50 is inserted into the corresponding hole 516. The first biasing members 51 and the holding members 50 (50R, 50G, and 50B) can thus be correctly assembled.

The reflective polarizing plate apparatus 5 for R and G light (5R and 5G) are assembled in the same manner as the reflective polarizing plate apparatus 5B for B light. The electro-optic apparatus 6 for R and G light (6R and 6G) are also assembled in the same manner as the electro-optic apparatus 6B for B light. The adjustment of the reflective polarizing plates 341 and the polarizing plates 343 relative to the reflective light modulating devices 342R and 342G is also made in the same manner as the adjustment of the reflective polarizing plate 341 and the polarizing plate 343 relative to the reflective light modulating device 342B.

The assembly and adjustment of the optical apparatus 7 will be described.

The electro-optic apparatus 6 for the color light fluxes (6R, 6G, and 6B) having been assembled and adjusted as described above are so temporarily placed that the polarizing plates 343 in the electro-optic apparatus 6 for the color light fluxes face the respective light-incident surfaces (not shown) of the cross dichroic prism 344. The positions of the pixels that form the combined image light fluxes having exited from the cross dichroic prism 344 are then adjusted. Specifically, for example, the positions of the pixels that form the image light fluxes are adjusted by adjusting the electro-optic apparatus 6R for R light and the electro-optic apparatus 6B for B light for each of the six axes with respect to the electro-optic apparatus 6G for G light in such a way that the pixels that form the three corresponding color light fluxes coincide with one another.

The thus adjusted electro-optic apparatus 6 for the color light fluxes are then fixed to the three light-incident surfaces of the cross dichroic prism 344, for example, with an adhesive. The optical apparatus 7 is thus completed, as shown in FIGS. 2A and 2B. It is noted that the adjustment of the electro-optic apparatus 6 for each of the color light fluxes is made by grasping a protrusion 64 formed at an upper portion of the supporting member 60.

The embodiment described above provides the following advantageous effects.

Each of the reflective polarizing plate apparatus 5 according to the present embodiment includes the reflective polarizing plate 341, the holding member 50, the first biasing member 51, and the second biasing member 52, and not only does the first biasing member 51 bias the glass surface 3412, which is a flat surface of the reflective polarizing plate 341, but also the second biasing member 52 biases the lower surface 3413, which is a side surface of the reflective polarizing plate 341. The fact that the side surface is also biasd allows the reflective polarizing plate 341 to be reliably fixed to the holding member 50, as compared with related art in which only the flat surface is biasd. The reflective polarizing plate 341 will therefore not rotate in the plane thereof relative to the holding member 50 even when an impact or vibration is applied.

In each of the reflective polarizing plate apparatus 5 according to the present embodiment, since the reflective polarizing plate 341 is so accommodated that the functional surface 3411 thereof faces the accommodating portion of the holding member 50 (recess 502) and the first biasing member 51 biases the glass surface 3412, which faces away from the functional surface 3411, the first biasing member 51 will not damage the functional surface 3411 (for example, wire grid will not be chipped or otherwise become defective), whereby the quality of the reflective polarizing plate 341 will not be degraded.

In each of the reflective polarizing plate apparatus 5 according to the present embodiment, since the horizontal side surface of the reflective polarizing plate 341 (lower surface 3413) is biasd, the reflective polarizing plate 341 will not be vertically shifted in the holding member 50, whereby the reflective polarizing plate 341 will not rotate in the plane thereof relative to the holding member 50.

In each of the reflective polarizing plate apparatus 5 according to the present embodiment, since the second biasing member 52 is formed of an elastic plate-shaped metal member, the second biasing member 52 can be readily formed.

In each of the reflective polarizing plate apparatus 5 according to the present embodiment, the first biasing member 51 has the opening 511, which has a light-blocking capability and ensures a predetermined effective region. The first biasing member 51 can therefore restrict the first linearly polarized light passing therethrough within an appropriate range because the first biasing member 51 transmits a light flux incident on the predetermined effective region and blocks a light flux incident on the region outside the effective region. When the reflective light modulating device 342 is disposed behind the thus configured reflective polarizing plate apparatus 5, and the effective region of the first biasing member 51 is set in correspondence with an effective region of the reflective light modulating device 342 (opening 3422), the first linearly polarized light can be appropriately incident on the effective region of the reflective light modulating device 342. The projector 1 using the reflective polarizing plate apparatus 5 can therefore provide improved contrast.

In each of the reflective polarizing plate apparatus 5 according to the present embodiment, in which the opening 511 of the first biasing member 51 has a substantially trapezoidal shape, even when the holding member 50 that accommodates the reflective polarizing plate 341 is so disposed that it is inclined to the direction in which a light flux is incident, the first linearly polarized light can be restricted within an appropriate range because the first biasing member 51 transmits the light flux incident on the trapezoidal opening 511 as the predetermined effective region. For example, when the reflective light modulating device 342 is so disposed behind the reflective polarizing plate apparatus 5 that the reflective light modulating device 342 is substantially perpendicular to the direction in which the light flux is incident, the light flux can be incident on the substantially rectangular effective region of the reflective light modulating device 342 (opening 3422).

In each of the reflective polarizing plate apparatus 5 according to the present embodiment, each side of the opening 511 of the first biasing member 51 is formed to be substantially linear, and no cutout, protrusion, or any other shape is formed along each side. When any of the sides has a cutout, a light flux is disadvantageously incident through the cutout, which is located outside the effective region, whereas when any of the sides has no cutout, no light flux from the region outside the effective region will be incident because no gap is formed. Further, when any of the sides has a protrusion, an incident light flux is disadvantageously blocked by the protrusion, which is located within the effective region, whereas when any of the sides has no protrusion, loss of light will not occur. As a result, the light blocking capability will not be degraded, but an appropriate amount of light can be ensured.

In each of the electro-optic apparatus 6 according to the present embodiment, the reflective polarizing plate apparatus 5 is so supported by and fixed to the first surface 61 that the functional surface 3411 of the accommodated reflective polarizing plate 341 faces the reflective light modulating device 342. As a result, the second linearly polarized light reflected off the reflective light modulating device 342 can be directly reflected off the functional surface 3411 of the reflective polarizing plate 341. If the functional surface 3411 does not face the reflective light modulating device 342, the second linearly polarized light travels inside the glass substrate that forms the reflective polarizing plate 341. In this case, the shift of the optical path due to the refractive index of the glass substrate increases cumulatively. The configuration described above can eliminate the cumulative increase in the shift of the optical path due to the refractive index of the glass substrate.

In each of the electro-optic apparatus 6 according to the present embodiment, the adjusters 8 (engaging portion 80) allow the reflective polarizing plate apparatus 5 to pivot in the plane thereof relative to the first surface 61 of the supporting member 60 so that the reflective polarizing plate 341 is angularly adjusted relative to the reflective light modulating device 342. The reflective polarizing plate 341 can thus be angularly adjusted relative to the reflective light modulating device 342, whereby the polarization angle with respect to the reflective light modulating device 342 can be optimized, and hence the second linearly polarized light can be reflected with loss of light reduced. Further, when the polarization angle is optimized, the polarization angle will not vary greatly and the difference between maximum and minimum contrast can be reduced. As a result, the contrast will not vary greatly but can be improved.

In each of the electro-optic apparatus 6 according to the present embodiment, the adjusters 8 allow the engaging portion 80 formed on the first surface 61 of the supporting member 60 (guiding surface portions for adjustment 81) to pivot along the engaging portion 80 formed on the holding member 50 (outer circumferential surface portions for adjustment 82), whereby the reflective polarizing plate 341 can be angularly adjusted relative to the reflective light modulating device 342. Further, after the adjustment, the fixing screws 86, which form the fixing portions 84, are inserted into the fixing portions 84 formed in the holding member 50 (elongated holes for fixation 85), and allowed to engage with the fixing portions 84 formed in the supporting member 60 (threaded holes 87), whereby the holding member 50 can be fixed to the supporting member 60. The reflective polarizing plate 341 can therefore be reliably adjusted and fixed.

In the optical apparatus 7 according to the present embodiment, the electro-optic apparatus 6 for the color light fluxes, in each of which the reflective polarizing plate 341 can be angularly adjusted relative to the reflective light modulating device 342, are disposed on the corresponding surfaces of the cross dichroic prism 344 so that color image light fluxes are combined. The configuration described above allows the contrast of the combined image light to be improved. Further, since the quality of each of the reflective polarizing plates 341 will not be degraded, the contrast can be maintained.

In the optical apparatus 7 according to the present embodiment, the orientations of the substantially trapezoidal openings 511 of the first biasing members 51 in the reflective polarizing plate apparatus 5 differ from one another (the orientations for G light and B light differ from the orientation for R light in the present embodiment). In the present embodiment, however, the first biasing members 51 having a common shape (the same shape) can be disposed in the holding members 50 (50R, 50G, and 50B) by rotating the first biasing members 51 in the planes thereof by 180 degrees as necessary. As a result, die and other costs of the first biasing members 51 can be reduced, as compared with a case where the first biasing members 51 have different shapes for the color light fluxes.

Since the projector 1 according to the present embodiment is so configured that each of the reflective polarizing plates 341 can be angularly adjusted relative to the corresponding reflective light modulating device 342, that the quality of the reflective polarizing plates 341 will not be degraded, and that the reflective polarizing plates 341 can be reliably fixed, the contrast of a projected image can be improved and the contrast can be maintained even when an impact or vibration is applied.

Second Embodiment

Figure 7:
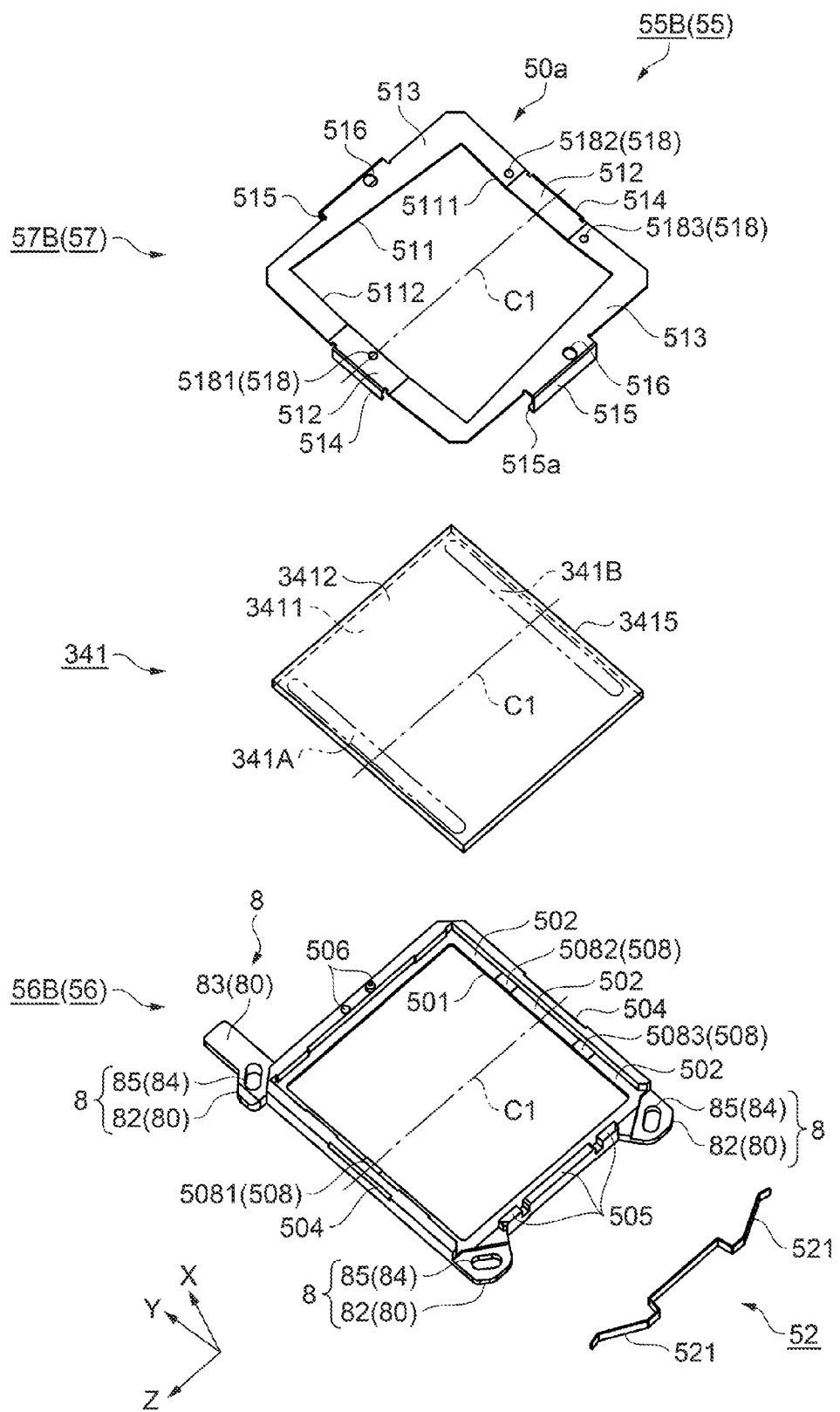
FIG. 7 is an exploded perspective view of a reflective polarizing plate apparatus for B light according to a second embodiment.
Figure 8:
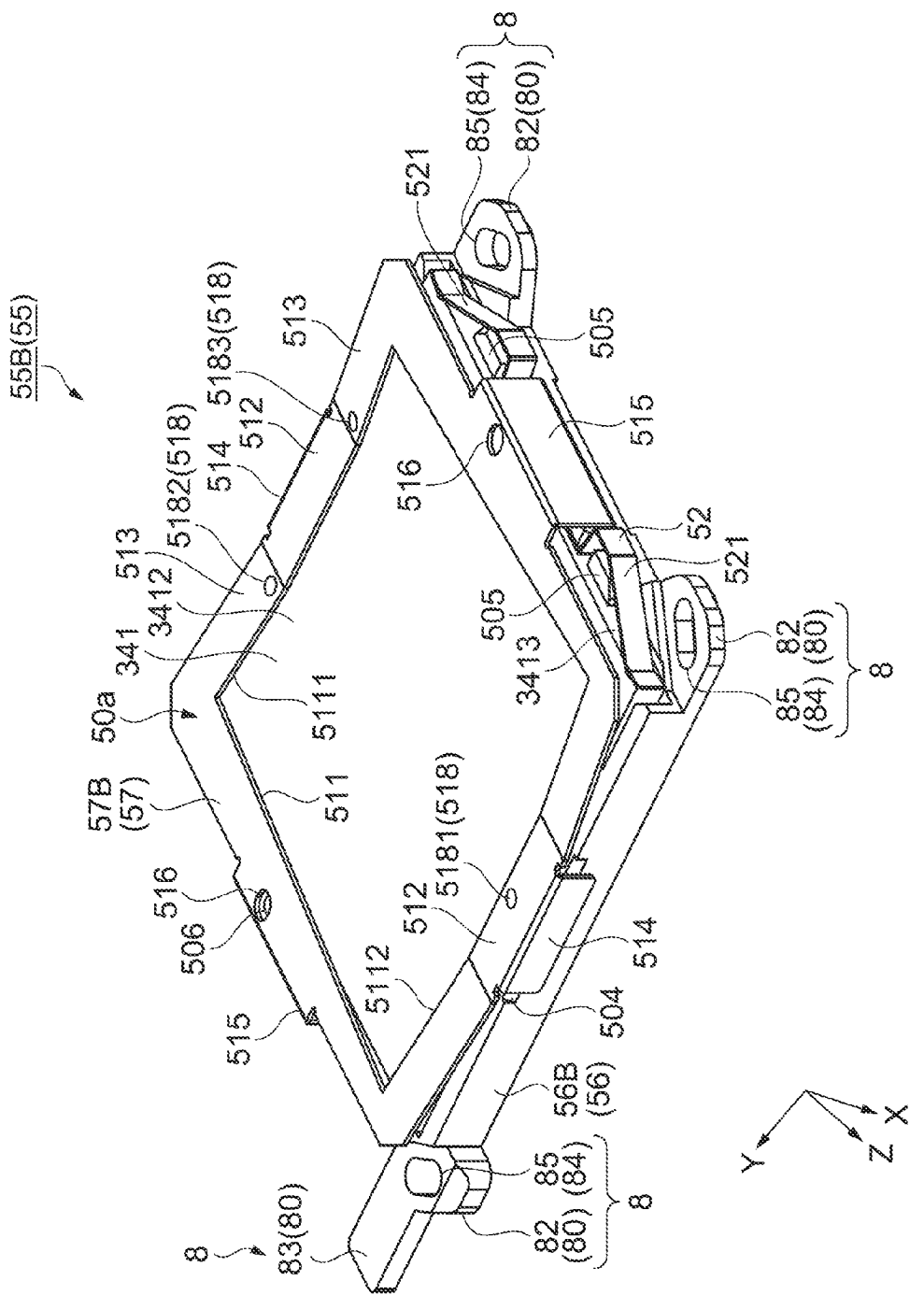
FIG. 8 is a perspective view of the reflective polarizing plate apparatus for B light.
Figure 9:
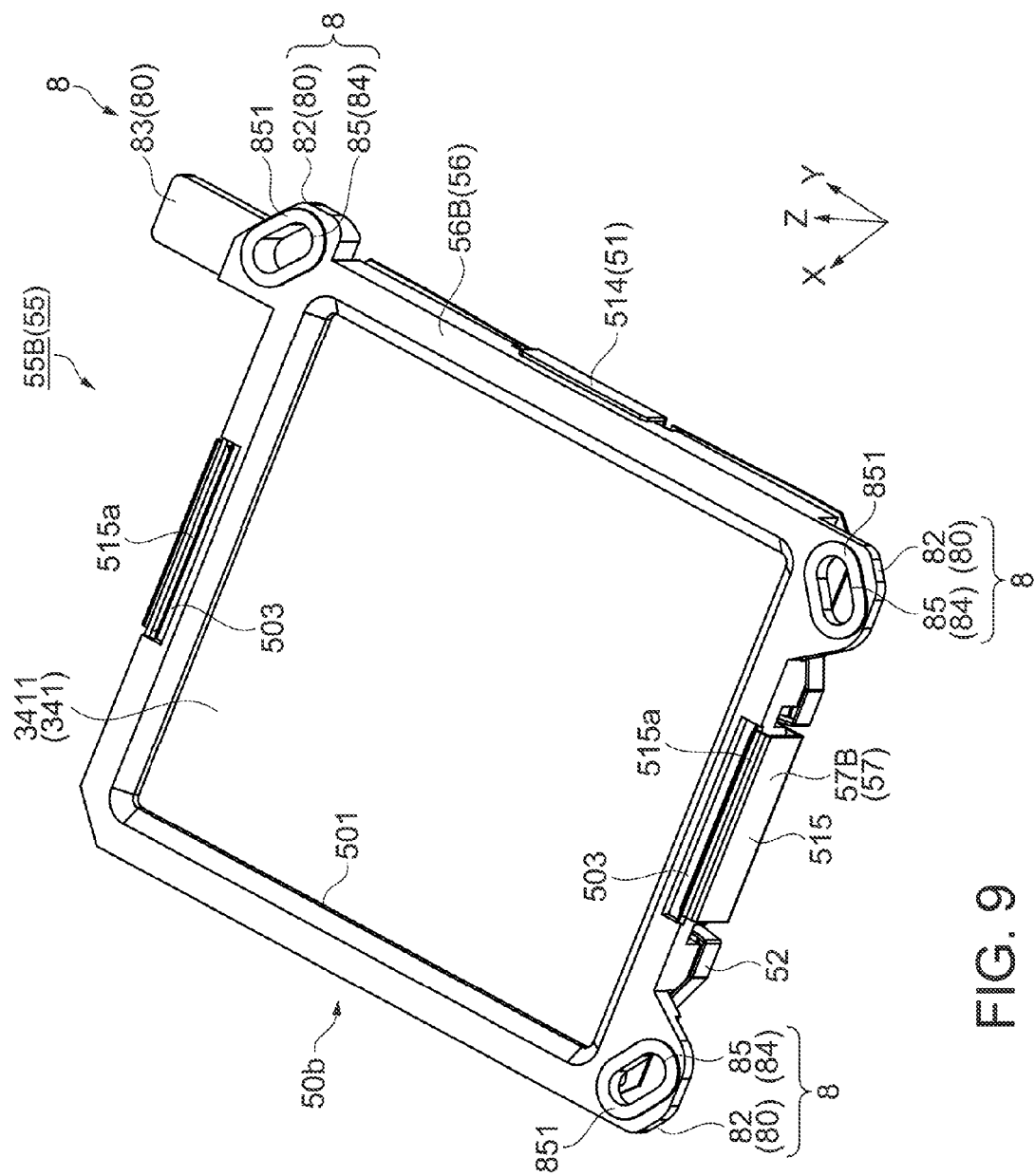
FIG. 9 is another perspective view of the reflective polarizing plate apparatus for B light.

FIG. 7 is an exploded perspective view of a reflective polarizing plate apparatus 55B for B light according to a second embodiment. FIGS. 8 and 9 are perspective views of the reflective polarizing plate apparatus 55B for B light. Specifically, FIG. 8 is a perspective view of the reflective polarizing plate apparatus 55B viewed in the direction in which the first linearly polarized light is incident on the reflective polarizing plate 341, and FIG. 9 is a perspective view of the reflective polarizing plate apparatus 55B viewed in the direction in which the first linearly polarized light incident on the reflective polarizing plate 341 passes therethrough. FIG. 8 shows a state immediately before hooking portions 515a of engaging pieces 515 of a first biasing member 57 are hooked to engaging grooves 503 of a holding member 56B. The configuration and operation of the reflective polarizing plate apparatus 55B will be described with reference to FIGS. 7 to 9.

The reflective polarizing plate apparatus 55B according to the present embodiment is configured in substantially the same manner as the reflective polarizing plate apparatus 5B according to the first embodiment and includes a holding member 56B, a reflective polarizing plate 341, a first biasing member 57, and a second biasing member 52. In the reflective polarizing plate apparatus 55B according to the present embodiment, the configuration of the holding member 56 that comes into contact with and holds the reflective polarizing plate 341 and the first biasing member 57 that biases the reflective polarizing plate 341 partially differs from the configuration of the holding member 50 and the first biasing member 51 in the first embodiment. In FIGS. 7 to 9, the same components as those in the first embodiment have the same reference characters. In the following description, components different from those in the first embodiment will be primarily described, and the same components as those in the first embodiment will not be described as appropriate.

The holding member 56 in the present embodiment differs from the holding member 50 in the first embodiment in that three holding portions 508 are formed in the recess 502, which is recessed from the outer circumference of the holding member 56. Further, the first biasing member 57 in the present embodiment differs from the first biasing member 51 in the first embodiment in that three biasing portions 518 are formed in positions facing the three holding portions 508 formed on the holding member 56. The other configurations of the holding member 56 and the first biasing member 57 are the same as those of the holding member 50 and the first biasing member 51 in the first embodiment.

The holding portions 508, which cooperate with the first biasing member 57, come into contact with and hold one surface of the reflective polarizing plate 341 (functional surface 3411 in the present embodiment). The holding portions 508 are configured as follows as shown in FIG. 7: A first holding portion 5081 is formed in a substantially central portion on the left side of the recess 502 and slightly protrudes from the recess 502, and a second holding portion 5082 and a third holding portion 5083 are formed on the right side of the recess 502 and slightly protrude from the recess 502. The amounts of protrusion of the three holding portions 508 from the recesses 502 are the same.

When the reflective polarizing plate 341 is accommodated in the recess 502, the three holding portions 508 come into contact with edge portions (341A and 341B) of the one surface of the reflective polarizing plate 341 (functional surface 3411) in such away that the first holding portion 5081 comes into contact with one location of one of the edge portions, the edge portion 341A, and the second holding portion 5082 and the third holding portion 5083 come into contact with two locations of the other edge portion, the edge portion 341B, as shown in FIG. 7.

The second holding portion 5082 and the third holding portion 5083 are formed in positions substantially symmetrical with respect to a central line C1 passing through the center of the first holding portion 5081 and parallel to the XZ plane, as shown in FIG. 7. In other words, the second holding portion 5082 and the third holding portion 5083 are disposed in positions substantially symmetrical with respect to the central line C1 passing through the center of the first holding portion 5081 and perpendicular to an exterior side 3415 of the other edge portion 341B of the reflective polarizing plate 341. Ideally, the first holding portion 5081, the second holding portion 5082, and the third holding portion 5083 form an equilateral triangle. The holding member 56B is formed of a metal member made, for example, of aluminum, and the three holding portions 508 are formed by cutting the metal member in a secondary manufacturing process.

The holding member 56B has a pair of engaging grooves 503, a pair of guiding grooves 504, and a plurality of guiding protrusions 505 formed thereon, as in the first embodiment, as shown in FIGS. 7 to 9. Further, as shown in FIG. 7, the holding member 56B has two direction regulators 506 formed thereon and is so configured that only the right direction regulator 506 is used, as in the first embodiment.

Further, three corners of the holding member 56B form three adjusters 8, as in the first embodiment. The adjusters 8 are formed of components of the holding member 56B and components of the supporting member 60B, and each of the adjusters 8 includes an engaging portion 80 and a fixing portion 84, as in the first embodiment.

As the engaging portions 80 that form the adjusters 8, the holding member 56B includes three outer circumferential surface portions for adjustment 82 and a protrusion for adjustment 83, as in the first embodiment. The three outer circumferential surface portions for adjustment 82 are guided along three guiding surface portions for adjustment 81 (see FIG. 4) as the engaging portions 80 that are formed on the first surface 61 of the supporting member 60B, as in the first embodiment. As the fixing portions 84 that form the adjusters 8, the holding member 56B has elongated holes for fixation 85, as in the first embodiment.

The first biasing member 57 cooperates with the holding member 56B to bias from the front side 50a a flat surface of the reflective polarizing plate 341 accommodated in the holding member 56B (glass surface 3412 of reflective polarizing plate 341 in present embodiment), as in the first embodiment. It is noted that the first biasing member 57 biases the reflective polarizing plate 341 with an appropriate magnitude of pressing force in an appropriate pressing method that do not distort the flat surface of the reflective polarizing plate 341.

Further, the first biasing member 57 also has a light-blocking capability and blocks a light flux incident on the region outside the opening 511, as in the first embodiment. The first biasing member 57 is formed by bending an elastic plate-shaped metal member. The first biasing member 57 has a substantially rectangular shape and has the opening 511 formed in a substantially central portion thereof.

The opening 511 has a substantially trapezoidal shape. Each side of the opening 511 is formed to be substantially linear, and no cutout, protrusion, or any other shape is formed along each side. The trapezoidal shape of the opening 511 is an isosceles trapezoid, and the upper base 5111 is located on the right and the lower base 5112 is located on the left, as shown in FIG. 7, as in the first embodiment.

First springs 512 are formed in central portions on the right and left sides of the first biasing member 57, and second springs 513 inclined in a direction that separates from the front side 50a with distance from the first springs 512 are formed on both sides of the first springs 512 or on the upper and lower sides of the first biasing member 57, as shown in FIG. 7, as in the first embodiment. Further, a pair of positioning pieces 514 bent toward the rear side 50b extend from the right and left first springs 512.

Further, a pair of engaging pieces 515 bent toward the rear side 50b extend from central portions on the upper and lower sides of the first biasing member 57 (central portions of upper and lower second springs 513), as in the first embodiment. A pair of hooking portions 515a are formed along the front ends of the engaging pieces 515.

Further, holes 516 that determine the orientation of the first biasing member 57 fixed to the holding member 56B are formed in the upper and lower second springs 513 in positions in the vicinity of the engaging pieces 515 and slightly to the right of the central portions of the second springs 513 (close to upper base 5111), as shown in FIG. 7, as in the first embodiment.

The first biasing member 57 has the three biasing portions 518 formed thereon, as shown in FIG. 7. The first biasing member 57 presses the reflective polarizing plate 341 when the three biasing portions 518 come into contact with the glass surface 3412 of the reflective polarizing plate 341.

The biasing portions 518 are so formed as shown in FIG. 7 that a first biasing portion 5181, which has a tip that has a substantially spherical shape and protrudes toward the rear side 50b (toward glass surface 3412 of reflective polarizing plate 341), is formed at the center of the first spring 512 located to the left of the opening 511 (where lower base 5112 is present) and a second biasing portion 5182 and a third biasing portion 5183, each of which has a tip that has a substantially spherical shape and protrudes toward the rear side 50b (toward glass surface 3412 of reflective polarizing plate 341), are formed on the upper and lower second springs 513 in positions to the right of the opening 511 (where upper base 5111 is present) as in the case of the first biasing portion 5181. In the present embodiment, the biasing portions 518 are formed in a punch process.

The three holding portions 508 of the holding member 56 and the three biasing portions 518 of the first biasing member 57 described above are formed in positions facing each other when the first biasing member 57 is attached to the holding member 56. Specifically, the first holding portion 5081 faces the first biasing portion 5181, the second holding portion 5082 faces the second biasing portion 5182, and the third holding portion 5083 faces the third biasing portion 5183.

The second biasing member 52 cooperates with the holding member 56B to bias a side surface of the reflective polarizing plate 341 (lower surface 3413) accommodated in the holding member 56B, as in the first embodiment. The second biasing member 52 is formed by bending an elastic plate-shaped metal member. The second biasing member 52 has a band-like shape and a symmetrical, substantially W-like cross-sectional shape. Two springs 521 that press the side surface of the reflective polarizing plate 341 are formed on both ends of the second biasing member 52.

Assembly of the reflective polarizing plate apparatus 55B will be described with reference to FIG. 7.

The second biasing member 52 is first inserted into the grooves between the guiding protrusions 505 of the holding member 56B. The reflective polarizing plate 341 is then inserted from the front side 50a into the recess 502 of the holding member 56B. The insertion is so performed that the functional surface 3411 of the reflective polarizing plate 341 (surface on which wire grid is formed) faces the recess 502, and that the lower surface 3413 of the reflective polarizing plate 341 presses the two springs 521 of the second biasing member 52 downward against the springs 521.

As described above, when the reflective polarizing plate 341 is inserted into the recess 502 of the holding member 56B, the three holding portions 508 come into contact with the reflective polarizing plate 341, whereby the holding member 56B holds the reflective polarizing plate 341. Specifically, the reflective polarizing plate 341 is so held that the first holding portion 5081 comes into contact with one edge portion 341A and the second holding portion 5082 and the third holding portion 5083 come into contact with the other edge portion 341B.

The reflective polarizing plate 341 is pressed by the second biasing member 52 sideways (from the side where lower surface 3413 is present) and supported and fixed as shown in FIG. 8. Specifically, the reflective polarizing plate 341 is so supported and fixed that it is pressed by the springs 521 of the second biasing member 52 in the direction perpendicular to the lower surface 3413. The functional surface 3411 of the reflective polarizing plate 341 faces the rear side 50b and is exposed through the opening 501, as shown in FIG. 7.

The first biasing member 57 is then placed on the holding member 56B. The first biasing member 57 is so placed by inserting the direction regulator 506 of the holding member 56B into the corresponding hole 516 of the first biasing member 57 that the positioning pieces 514 catch the guiding grooves 504. The engaging pieces 515 are then pressed toward the engaging grooves 503 against the biasing forces of the first springs 512 and the second springs 513, and the hooking portions 515a are hooked to the engaging grooves 503, as shown in FIG. 9.

The reflective polarizing plate 341 is thus held by the three holding portions 508 of the holding member 56B and so supported and fixed that the surface facing away from the functional surface 3411 (glass surface 3412) is pressed from the front side 50a by the three biasing portions 518 of the first biasing member 57, which are formed in the positions facing the three holding portions 508. The glass surface 3412 of the reflective polarizing plate 341 faces the front side 50a and is exposed through the trapezoidal opening 511 of the first biasing member 57.

In the assembling process, the reflective polarizing plate 341 is held by the three holding portions 508 of the holding member 56B and so supported and fixed that the three biasing portions 518 of the first biasing member 57 perpendicularly press the glass surface 3412. The reflective polarizing plate 341 is further so supported and fixed that the springs 521 of the second biasing member 52 press the lower surface 3413.

The assembly of the reflective polarizing plate apparatus 55B is thus completed.

The reflective polarizing plate apparatus 55 for R light and G light (55R and 55G) according to the present embodiment are assembled in the same manner as the reflective polarizing plate apparatus 55B for B light described above. A holding member 56R used in the reflective polarizing plate apparatus 55R for R light is so formed that the holding member 56R and the holding member 56B (56G) are bilaterally symmetrical, as in the first embodiment. A first biasing member 57R used in the reflective polarizing plate apparatus 55R for R light is the same member as the first biasing member 57B but rotated in the plane thereof by 180 degrees, as in the first embodiment.

The electro-optic apparatus 6B according to the present embodiment is configured and assembled in the same manner as the electro-optic apparatus 6B according to the first embodiment except that the configuration of the reflective polarizing plate apparatus 55B is different in terms of the points described above. The adjustment made by the adjusters 8 (adjustment of reflective polarizing plate 341 and polarizing plate 343 relative to reflective light modulating device 342B) is also the same as the adjustment in the first embodiment, and no description thereof is therefore made. Further, the behavior of B light in the adjusted electro-optic apparatus 6B is also the same as the behavior in the first embodiment, and no description thereof is therefore made.

The electro-optic apparatus 6 for R light and G light (6R and 6G) according to the present embodiment are also configured and assembled in the same manner as the electro-optic apparatus 6 (6R and 6G) according to the first embodiment except that the configurations of the reflective polarizing plate apparatus 55R and 55G are different in terms of the points described above. The adjustment made by the adjusters 8 (adjustment of reflective polarizing plates 341 and polarizing plates 343 relative to reflective light modulating devices 342R and 342G) is also the same as the adjustment in the first embodiment, and no description thereof is therefore made. The assembly and adjustment of the optical apparatus 7 according to the present embodiment is also the same as those in the first embodiment, and no description thereof is therefore made.

The second embodiment described above provides not only the same advantageous effects as those provided by the first embodiment but also the following advantageous effects.

In each of the reflective polarizing plate apparatus 55 according to the present embodiment, the first biasing member 57 biases a flat surface of the reflective polarizing plate 341, whereby the reflective polarizing plate 341 can be fixed to the holding member 56. Specifically, the reflective polarizing plate 341 is so fixed that one surface of the reflective polarizing plate 341 (functional surface 3411) comes into contact with the three holding portions 508 of the holding member 56 and the other surface of the reflective polarizing plate 341 (glass surface 3412) is pressed and biased by the three biasing portions 518 of the first biasing member 57 that face the three holding portions 508. In the configuration described above, both surfaces of the reflective polarizing plate 341 can be supported by the three holding portions 508 and the three biasing portions 518 facing each other. Further, the three-point supporting allows the reflective polarizing plate 341 to be fixed to the holding member 56 with an appropriate magnitude of pressing force in an appropriate pressing method. Moreover, the three-point supporting allows the reflective polarizing plate 341 to be reliably fixed without deformation or any other defects even when an impact (including physical and thermal impact), vibration, or any other external force is applied. As a result, the reflective polarizing plate 341 itself will not be distorted in normal operation, or the reflective polarizing plate 341 will not move relative to the holding member 56 even when an impact, vibration, or any other external force is applied thereto. Optical characteristics of the reflective polarizing plate 341 can therefore be maintained not only in normal operation but also when an impact, vibration, or any other external force is applied thereto.

In each of the reflective polarizing plate apparatus 55 according to the present embodiment, each of the biasing portions 518 of the first biasing member 57 has a substantially spherical tip and protrudes toward the glass surface 3412 of the reflective polarizing plate 341. The thus configured biasing portions 518 allow the glass surface 3412 of the reflective polarizing plate 341 to be appropriately supported and biased even if the biasing portions 518 are shifted.

In each of the reflective polarizing plate apparatus 55 according to the present embodiment, the holding portions 508 of the holding member 56 come into contact with one surface of the reflective polarizing plate 341 (functional surface 3411) in such a way that one of the holding portions 508 (first holding portion 5081) comes into contact with the edge portion 341A and two of the holding portions 508 (second holding portion 5082 and third holding portion 5083) come into contact with the edge portion 341B facing the edge portion 341A. In correspondence therewith, the biasing portions 518 of the first biasing member 57 are formed to face the holding portions 508 (first biasing portion 5181 is formed to face first holding portion 5081, second biasing portion 5182 is formed to face second holding portion 5082, and third biasing portion 5183 is formed to face third holding portion 5083) and press the other surface of the reflective polarizing plate 341 (glass surface 3412). As a result, the reflective polarizing plate 341 can be stably fixed to the holding member 56.

In each of the reflective polarizing plate apparatus 55 according to the present embodiment, the second holding portion 5082 and the third holding portion 5083, which come into contact with two respective locations of the other edge portion 341B, are provided in positions substantially symmetrical with respect to the central line C1 passing through the first holding portion 5081, which comes into contact with one location of the one edge portion 341A, and perpendicular to the exterior side 3415 of the other edge portion 341B of the reflective polarizing plate 341. As a result, the reflective polarizing plate 341 can be more stably fixed to the holding member 56.

A variety of changes, improvements, and other modifications can be made to the first and second embodiments described above to the extent that the changes, improvements, and other modifications do not depart from the substance thereof. Variations will be described below.

In each of the reflective polarizing plate apparatus 5 according to the first embodiment described above, since the second biasing member 52 biases the horizontal side surface of the reflective polarizing plate 341 (lower surface 3413), the reflective polarizing plate 341 will not be vertically shifted in the holding member 50. The second biasing member 52 is not necessarily configured this way and may bias a vertical side surface of the reflective polarizing plate 341 so that the reflective polarizing plate 341 is not horizontally shifted. Still alternatively, vertical and horizontal side surfaces of the reflective polarizing plate 341 may be biased so that the reflective polarizing plate 341 is not vertically or horizontally shifted. The same holds true for the second embodiment.

In each of the reflective polarizing plate apparatus 5 according to the first embodiment described above, the second biasing member 52 is formed of an elastic metal member. The second biasing member 52 is not necessarily made of a metal but may only need to be formed of an elastic member, for example, may be formed of an elastic synthetic resin member. The same holds true for the second embodiment.

In each of the reflective polarizing plate apparatus 5 according to the first embodiment described above, the first biasing member 51 and the second biasing member 52 are separate components. They are not necessarily configured this way, and the first biasing member 51 and the second biasing member 52 may be integrated with each other and may bias flat and side surfaces of the reflective polarizing plate 341. The same holds true for the second embodiment.

In each of the electro-optic apparatus 6 according to the first embodiment described above, the adjusters 8 allow the engaging portions 80 (guiding surface portions for adjustment 81) formed on the first surface 61 of the supporting member 60 to pivot along the outer circumferential surfaces of the holding member 50 (outer circumferential surface portions for adjustment 82) so that the reflective polarizing plate 341 is angularly adjusted relative to the reflective light modulating device 342. The reflective polarizing plate 341 is not necessarily angularly adjusted this way. For example, the reflective polarizing plate 341 may be angularly adjusted relative to the reflective light modulating device 342 by inserting the fixing screws 86 into the elongated holes for fixation 85 formed in the holding member 50, temporarily allowing the fixing screws 86 to engage with the threaded holes 87 in the supporting member 60, and then allowing the holding member 50 to pivot relative to the supporting member 60 with respect to the fixing screws 86. The same holds true for the second embodiment.

In each of the electro-optic apparatus 6 according to the first embodiment described above, the outer circumferential surfaces of corners of the holding member 50 form the engaging portions 80 formed on the holding member 50. The engaging portions are not necessarily formed this way and may be formed in regions sandwiched between the opening 501 of the holding member 50 and the exterior shape (outer circumference) thereof. The same holds true for the second embodiment.

In each of the reflective polarizing plate apparatus 55 according to the second embodiment described above, each of the holding portions 508 of the holding member 56 has a flat portion of a certain area that comes into contact with the functional surface 3411 of the reflective polarizing plate 341. The area of the flat portion is preferably minimized.

In each of the reflective polarizing plate apparatus 55 according to the second embodiment described above, each of the biasing portions 518 of the first biasing member 57 protrudes therefrom and has a substantially spherical tip. Each of the biasing portions 518 is not necessarily shaped this way and may protrude from the first biasing member 57 and have a tip having a curved cross-sectional shape instead of a spherical shape.

In each of the reflective polarizing plate apparatus 55 according to the second embodiment described above, the holding portions 508 of the holding member 56 are disposed on the right and left sides of the recess 502 when viewed from the side facing the front side 50a. The holding portions 508 are not necessarily disposed this way and may be disposed on the upper and lower sides of the recess 502 although depending on the shape of the first biasing member 57. Still alternatively, depending on the shape of the reflective polarizing plate 341, the holding portions 508 may be so provided that one is on either upper or lower side and one is on each of the right and left sides or that one is on either right or left side and one is on each of the upper and lower sides. The biasing portions 518 of the first biasing member 57 may be disposed in positions facing the holding portions 508 of the holding member 56.

The first embodiment has been described with reference to the configuration in which each of the reflective polarizing plate apparatus 5 includes the holding member 50 that accommodates the reflective polarizing plate 341, the first biasing member 51 that biases a flat surface of the reflective polarizing plate 341, and the second biasing member 52 that biases aside surface of the reflective polarizing plate 341. Each of the reflective polarizing plate apparatus 5 is not necessarily configured this way, and the reflective polarizing plate 341 may be replaced with a non-reflective polarizing plate including the polarizing plate 343 or any other suitable component. In this case, each of the polarizing plate apparatus may include a holding member that accommodates a polarizing plate (polarizing plate 343, for example), a first biasing member that biases a flat surface of the polarizing plate, and a second biasing member that biases a side surface of the polarizing plate. Further, when the polarizing plate is disposed on a glass substrate, the first biasing member preferably biases the surface (glass surface in this case) facing away from the functional surface (polarizing plate in this case). The polarizing plate may then be angularly adjusted relative to a reflective light modulating device (reflective light modulating device 342, for example) by using adjusters (equivalent to adjusters 8 in the embodiments described above, for example) to rotate the polarizing plate in the plane thereof. The configuration described above prevents the quality of the polarizing plate from being degraded, allows the polarizing plate to be reliably fixed against an impact or vibration, and improves the contrast by angularly adjusting the polarizing plate relative to the reflective light modulating device. The same holds true for the second embodiment.

The optical system of the projector 1 according to the first embodiment described above is what is called a three-panel system using three reflective light modulating devices 342R, 342G, and 342B corresponding to R light, G light, and B light. The optical system is not limited thereto and may be a single-panel system. When the reflective polarizing plate apparatus 5 and the electro-optic apparatus 6 according to the first embodiment are used with a single-panel reflective light modulating device, the degree of partially out-of-focus projected image can be reduced. The same holds true for the second embodiment.

In the optical system of the projector 1 according to the first embodiment described above, the light source apparatus 31 includes the light source 311 and the reflector 312, and the light source 311 is formed of an ultrahigh pressure mercury lamp, a metal halide lamp, or any other discharge-type lamp. The light source apparatus is not necessarily configured this way and may include a laser diode, an LED (light emitting diode), an organic EL (electro luminescence) device, a silicon light emitting device, or any of variety of other solid-state light emitting devices. The same holds true for the second embodiment.

The present application claims the priority based on JP-A-2011-155470 filed on Jul. 14, 2011 and JP-A-2011-222589 filed on Oct. 7, 2011, and the entirety of which is incorporated herein.

What is claimed is:

1. A reflective polarizing plate apparatus comprising:
a reflective polarizing plate that transmits first linearly polarized light and reflects second linearly polarized light polarized in a direction substantially perpendicular to the direction in which the first linearly polarized light is polarized;
a holding member that accommodates and holds the reflective polarizing plate;
a first biasing member that biases a flat surface of the reflective polarizing plate accommodated in the holding member; and
a second biasing member that biases a side surface of the reflective polarizing plate accommodated in the holding member,
wherein
the second biasing member includes a first biasing portion and a second biasing portion that presses against both ends of the side surface, and
the second biasing member is disposed between the holding member, which overlaps a first surface of the reflective polarizing plate, and the first biasing member, which overlaps a second surface of the reflective polarizing plate opposite to the first surface.

2. The reflective polarizing plate apparatus according to claim 1,
wherein the reflective polarizing plate is so accommodated that a functional surface thereof faces an accommodating portion of the holding member, and
the first biasing member biases a surface facing away from the functional surface.

3. The reflective polarizing plate apparatus according to claim 1, wherein the first biasing member has a light-blocking capability and an opening that ensures a predetermined effective region, and
the opening has a substantially trapezoidal shape.

4. An electro-optic apparatus comprising:
the reflective polarizing plate apparatus according to claim 1;
a reflective light modulating device that modulates the first linearly polarized light having passed through the reflective polarizing plate apparatus in accordance with image information to form image light and reflects the image light as the second linearly polarized light; and
a substantially triangularly columnar-shaped supporting member having a first surface that supports the reflective polarizing plate apparatus, a second surface that supports the reflective light modulating device, and a third surface,
wherein the reflective polarizing plate apparatus is so supported by and fixed to the first surface that a functional surface of the accommodated reflective polarizing plate faces the reflective light modulating device.

5. The reflective polarizing plate apparatus according to claim 1,
wherein
the first biasing member includes an opening and first springs,
the first springs are formed in one set of sides of the first biasing member facing each other across the opening, and
the second biasing member is positioned in a portion of the holding member other than where the first springs contact the holding member.

6. The electro-optic apparatus according to claim 4,
further comprising an adjuster that angularly adjusts the reflective polarizing plate relative to the reflective light modulating device by allowing the reflective polarizing plate apparatus to pivot in the plane thereof relative to the first surface of the supporting member.

7. The electro-optic apparatus according to claim 6,
wherein the adjuster includes
engaging portions that are formed on the supporting member and the holding member and allow the holding member to pivot, and
a fixing portion that fixes the holding member to the supporting member.

8. An optical apparatus comprising:
the electro-optic apparatus according to claim 4 provided for each of red, green, and blue three color light fluxes; and
a cross dichroic prism that has surfaces on which the corresponding electro-optic apparatus are disposed, combines the image light fluxes modulated and outputted by the electro-optic apparatus, and outputs the combined image light.

9. A projector comprising:
the optical apparatus according to claim 8.

10. A reflective polarizing plate apparatus comprising:
a reflective polarizing plate that transmits first linearly polarized light and reflects second linearly polarized light polarized in a direction substantially perpendicular to the direction in which the first linearly polarized light is polarized;
a holding member that accommodates and holds the reflective polarizing plate; and
a first biasing member that biases a flat surface of the reflective polarizing plate accommodated in the holding member, wherein
the first biasing member includes an opening, first springs, second springs, and a pair of engaging pieces,
the first springs are formed in one set of sides of the first biasing member facing each other across the opening,
the second springs extend away from the first springs and are inclined in a direction that separates away from the reflective polarizing plate as a distance from the first springs increases, and
the pair of engaging pieces are formed in another set of sides of the first biasing member facing each other across the opening, and are engaging the holding member.

11. The reflective polarizing plate apparatus according to claim 10,
wherein the holding member has three holding portions that come into contact with, and hold one surface of, the reflective polarizing plate, and
the first biasing member has three biasing portions in positions facing the three holding portions, and the three biasing portions press and bias the other surface of the reflective polarizing plate.

12. The reflective polarizing plate apparatus according to claim 11,
wherein each of the biasing portions has a substantially spherical tip and protrudes toward the other surface.

13. The reflective polarizing plate apparatus according to claim 11,
wherein the reflective polarizing plate has a rectangular shape, and
the holding portions come into contact with the one surface of the reflective polarizing plate in such a way that one of the holding portions comes into contact with one edge portion and the remaining two holding portions come into contact with the other edge portion facing the edge portion.

14. The reflective polarizing plate apparatus according to claim 13,
wherein the two holding portions that come into contact with the other edge portion are disposed in positions substantially symmetrical with respect to a central line passing through the holding portion that comes into contact with the one edge portion and perpendicular to an exterior side of the other edge portion of the reflective polarizing plate.

15. An electro-optic apparatus comprising:
the reflective polarizing plate apparatus according to claim 10;
a reflective light modulating device that modulates the first linearly polarized light having passed through the reflective polarizing plate apparatus in accordance with image information to form image light and reflects the image light as the second linearly polarized light; and
a substantially triangularly columnar-shaped supporting member having a first surface that supports the reflective polarizing plate apparatus, a second surface that supports the reflective light modulating device, and a third surface,
wherein the reflective polarizing plate apparatus is so supported by and fixed to the first surface that a functional surface of the accommodated reflective polarizing plate faces the reflective light modulating device.

16. The electro-optic apparatus according to claim 15,
further comprising an adjuster that angularly adjusts the reflective polarizing plate relative to the reflective light modulating device by allowing the reflective polarizing plate apparatus to pivot in the plane thereof relative to the first surface of the supporting member.

17. The electro-optic apparatus according to claim 16,
wherein the adjuster includes
engaging portions that are formed on the supporting member and the holding member and allow the holding member to pivot, and
a fixing portion that fixes the holding member to the supporting member.

18. An optical apparatus comprising:
the electro-optic apparatus according to claim 15 provided for each of red, green, and blue three color light fluxes; and
a cross dichroic prism that has surfaces on which the corresponding electro-optic apparatus are disposed, combines the image light fluxes modulated and outputted by the electro-optic apparatus, and outputs the combined image light.

19. A projector comprising:
the optical apparatus according to claim 18.

20. The reflective polarizing plate apparatus according to claim 10, further comprising:
a second biasing member that biases a side surface of the reflective polarizing plate accommodated in the holding member.

* * * * *